United States Patent
Lapelosa

(10) Patent No.: US 10,518,352 B2
(45) Date of Patent: Dec. 31, 2019

(54) DEVICE FOR CLEANING WELDS

(71) Applicant: WALTER SURFACE TECHNOLOGIES INC., Pointe-Claire (CA)

(72) Inventor: Michele Lapelosa, Sant Agata Bolognese (IT)

(73) Assignee: WALTER SURFACES TECHNOLOGIES INC., Pointe-Claire (Quebec) (CA)

( * ) Notice: Subject to any disclaimer, the term of this patent is extended or adjusted under 35 U.S.C. 154(b) by 213 days.

(21) Appl. No.: 15/502,096

(22) PCT Filed: Aug. 4, 2015

(86) PCT No.: PCT/CA2015/050733
§ 371 (c)(1),
(2) Date: Feb. 6, 2017

(87) PCT Pub. No.: WO2016/019460
PCT Pub. Date: Feb. 11, 2016

(65) Prior Publication Data
US 2017/0225257 A1      Aug. 10, 2017

Related U.S. Application Data

(60) Provisional application No. 62/033,003, filed on Aug. 4, 2014, provisional application No. 62/182,814, filed on Jun. 22, 2015.

(51) Int. Cl.
*B23K 9/32* (2006.01)
*B23K 37/00* (2006.01)
(Continued)

(52) U.S. Cl.
CPC ............... *B23K 9/32* (2013.01); *A46B 7/04* (2013.01); *A46B 7/044* (2013.01); *A46B 7/048* (2013.01);
(Continued)

(58) Field of Classification Search
CPC ......... B23K 9/32; B23K 37/00; B23K 37/08; B23K 31/02; A46B 15/0022; A46B 7/044;
(Continued)

(56) References Cited

U.S. PATENT DOCUMENTS 785,463 A    3/1905  Winnie
822,377 A    6/1906  Lesso
(Continued)

FOREIGN PATENT DOCUMENTS

JP    2012-241227 A  * 12/2012  ............... C25F 1/06
WO    2005089968 A1    9/2005
WO    2013181715 A1   12/2013

OTHER PUBLICATIONS

Computer generated English translation of JP 2012-241227A, Taguchi, C., Dec. 2012.*
(Continued)

*Primary Examiner* — Laura C Guidotti

(57) ABSTRACT

A device for cleaning welds. The device comprises a bristles pad, the bristles pad being electrically conductive to deliver electrical current to a weld to be cleaned when the bristles pad is in physical contact with the weld. The device further includes a bristles pad support, the bristles pad support including an elongated body receiving the bristles pad and extending along the bristles pad, the elongated body including a first section and a second section attached to each other, the first section being separable from the second section to reduce a length of the bristles pad support.

14 Claims, 32 Drawing Sheets

(51) Int. Cl.
    *A46B 7/04*     (2006.01)
    *A46B 15/00*    (2006.01)
    *A46B 1/00*     (2006.01)
    *B08B 1/00*     (2006.01)
(52) U.S. Cl.
    CPC .......... *A46B 15/0022* (2013.01); *B23K 37/00* (2013.01); *A46B 1/00* (2013.01); *A46B 2200/30* (2013.01); *A46B 2200/3073* (2013.01); *A46B 2200/3093* (2013.01); *B08B 1/002* (2013.01)
(58) Field of Classification Search
    CPC ..... A46B 7/046; A46B 7/048; A46B 2200/30; A46B 2200/3073; A46B 2200/3093; C25F 1/00; C25F 7/00
    See application file for complete search history.

(56)            References Cited

U.S. PATENT DOCUMENTS

|  |  |  |
|---|---|---|
| 927,232 A | 7/1909 | Gindorff |
| 928,699 A | 7/1909 | Reese |
| 3,795,024 A | 3/1974 | Weihrauch |
| 2012/0000026 A1 | 2/2012 | Bunting |

OTHER PUBLICATIONS

International Search Report and Written Opinion of PCT/CA2015/050733, dated Nov. 3, 2015, pp. 1-10.

\* cited by examiner

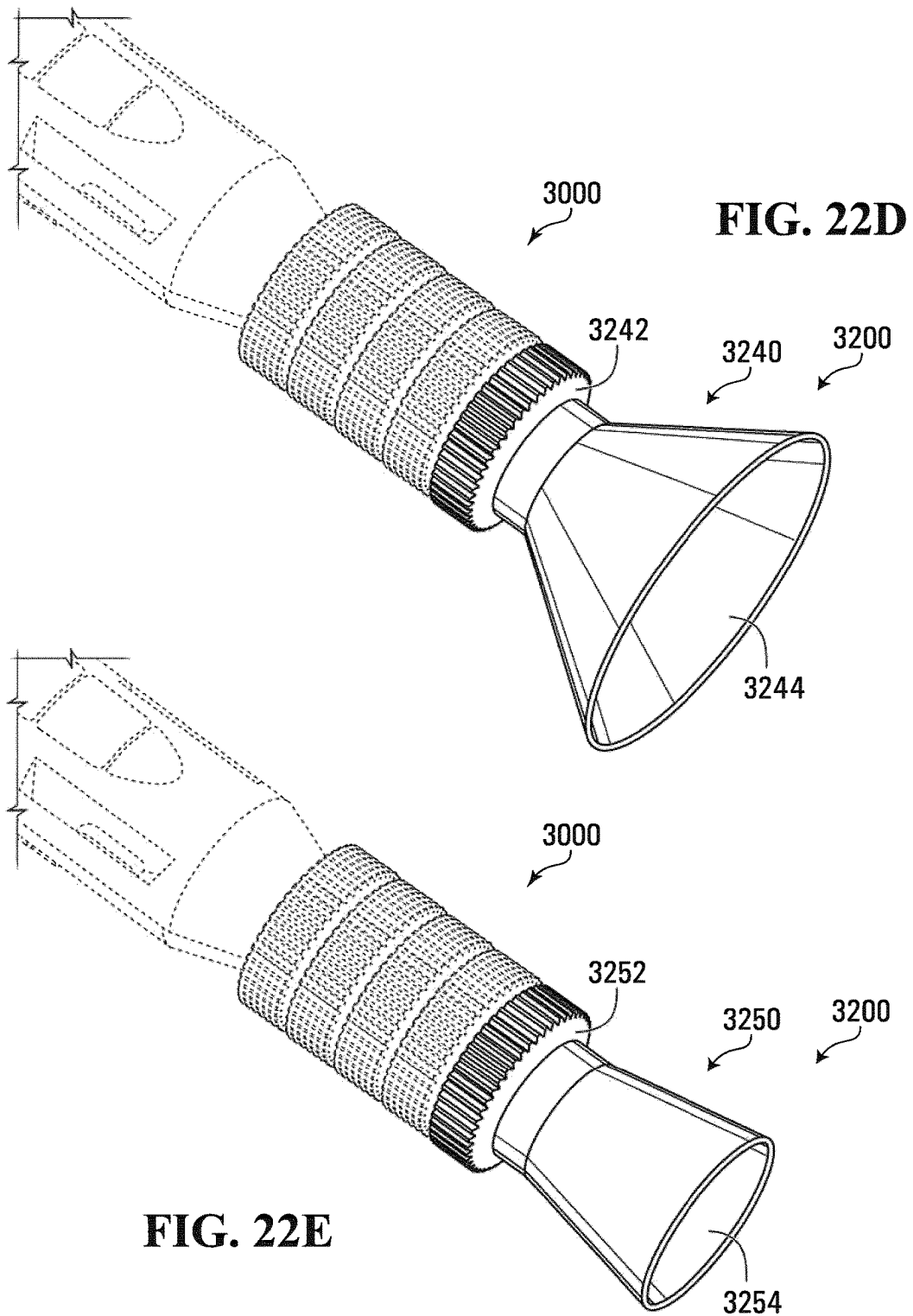

DEVICE FOR CLEANING WELDS

CROSS-REFERENCE TO RELATED APPLICATIONS

This application claims the benefit and priority to U.S. provisional application No. 62/033,003, filed on Aug. 4, 2014 and to U.S. provisional application No. 62/182,814, filed on Jun. 22, 2015, the content of which is herein incorporated by reference.

FIELD OF THE TECHNOLOGY

The present disclosure generally relates to a device and process for cleaning welds.

BACKGROUND

Welding of metals products such as stainless steel products may result in heat tint discoloration in the heat-affected zone of the stainless steel weld. The heat tinting is generally a thickening of the naturally occurring oxide layer on the surface of stainless steel. As heat tint colors are formed on stainless steel, chromium is drawn from below the surface of the metal to form a chromium rich oxide surface layer. This leaves the metal just below the surface with a lower chromium level. The reduction in the sub-surface chromium typically reduces the corrosion resistance of the steel. In order to restore the corrosion resistance of the finished stainless steel product, the weld heat tint needs to be removed.

It is common procedure to clean the weld to remove the weld heat tint, which typically results in rebuilding of the passive layer around the weld and the restoration of the corrosion resistance of the weld. The removal of heat tint from welds of stainless steel may be done by techniques such as using pickling pastes, wire brushing, grinding or electrolytic methods. The use of pickling pastes can be hazardous while brushing and grinding is a labor-intensive process, leaving electrolytic methods as usually a safer, faster and more cost effective way for cleaning welds.

Existing welding cleaning systems that make use of electrolyte methods typically use a brush with electrically conductive bristles, such as bristles made of carbon fiber strands, which is supplied with an electric current and an electrolyte solution. When the carbon fiber tipped brush with the electric current and electrolyte solution is applied to the welded area affected by heat tint, an electrochemical cleaning of welded area occurs. Weld cleaning systems of this type are used to clean welds which were formed using gas tungsten arc welding, also known as tungsten inert gas (TIG) welding.

A popular type of welding is gas metal arc welding, also known as metal inert gas (MIG) welding. However, a problem with existing weld cleaning systems is that for the cleaning systems to clean a MIG weld a higher current is usually required, when compared with the current level required to clean a TIG weld. When a higher current is required, the carbon fiber brush wears down faster requiring the brush to be replaced more frequently. The frequent replacement of the carbon fiber brush can be problematic, as carbon fiber brushes are relatively expensive.

Therefore, given the relatively high cost of replacing a brush in a weld cleaning system, there is a need in the industry to provide an apparatus and process that alleviates, at least in part, the deficiencies with existing apparatuses and processes for cleaning welds.

SUMMARY OF THE INVENTION

As embodied and broadly described herein, the invention provides in a first aspect a device for cleaning welds. The device comprises a bristles pad, the bristles pad being electrically conductive to deliver electrical current to a weld to be cleaned when the bristles pad is in physical contact with the weld. The device further includes a bristles pad support, the bristles pad support including an elongated body receiving the bristles pad and extending along the bristles pad, the elongated body including a first section and a second section attached to each other, the first section being separable from the second section to reduce a length of the bristles pad support.

In a specific and non-limiting example of implementation, the bristles pad has a working end portion for engaging the weld, and an opposite support end portion mounted to an end-piece configured to be grasped by a hand of an operator. The bristles pad support is mounted to the bristles pad in a non-sliding relationship such as to permanently preclude the bristles pad support to slide along the bristles pad.

The first section is linked with the second section through a frangible connection that can be manually snapped-off to separate the first section from the second section. Alternatively, the first section is linked with the second section through a connection allowing separation of the first and second section and a subsequent re-connection of the first and second sections.

Optionally, the device includes a fluid connection between the end-piece and the bristles pad to supply weld-cleaning fluid to the bristles pad and also includes an electrical connection between the end-piece and the bristles pad to supply electrical power to the bristles pad.

As embodied and broadly described herein, the invention provides in a second aspect a device for cleaning welds. The device comprising a bristles pad, the bristles pad being electrically conductive to deliver electrical current to a weld to be cleaned when the bristles pad is in physical contact with the weld and a bristles pad support, the bristles pad support including an elongated body receiving the bristles pad and extending along the bristles pad, the elongated body having an adjustable length allowing to vary a length of a portion of the bristles pad engaged by the bristles pad support.

In a non-limiting example of implementation the device for cleaning welds as defined in claim 15, wherein the bristles pad is mounted to an end-piece configured to be grasped by the hand of an operator. A fluid connection is provided between the end-piece and the bristles pad to supply weld-cleaning fluid to the bristles pad along with an electrical connection to supply electrical power to the bristles pad.

The bristles pad support includes a plurality of sections arranged into a stack and defining a void area for receiving the bristles pad. The plurality of sections are separable from each other. They can be connected to each other by frangible connections such that they can be manually snapped-off. Alternatively, the connections can be such as to allow the sections to be separated and subsequently re-assembled.

As embodied and broadly described herein, the invention provides in a third aspect a device for cleaning welds, comprising a bristles pad, the bristles pad being electrically conductive to deliver electrical current to a weld to be cleaned when the bristles pad is in physical contact with the weld and a bristles pad support, the bristles pad support including an elongated body receiving the bristles pad and extending along the bristles pad, the elongated body being adjustable to acquire a curved shape such as to force the bristles pad to bend.

As embodied and broadly described herein, the invention provides in a fourth aspect a bristles pad, the bristles pad being electrically conductive to deliver electrical current to a weld to be cleaned when the bristles pad is in physical contact with the weld and a bristles pad support, the bristles pad support including an elongated body receiving the bristles pad and extending along the bristles pad, the elongated body including a pair of telescoping sections.

BRIEF DESCRIPTION OF THE DRAWINGS

A detailed description of embodiments of the invention is provided below, by way of example only, with reference to the accompanying drawings, in which:

FIGS. 22A-22E are perspective views of bristles pad supports with spouts designed to provide to the bristles pad a desired cross sectional shape;

It is to be expressly understood that the description and drawings are only for the purpose of illustrating certain embodiments of the invention and are an aid for understanding. They are not intended to be a definition of the limits of the invention.

DETAILED DESCRIPTION

Weld Cleaning System

Figure 1:
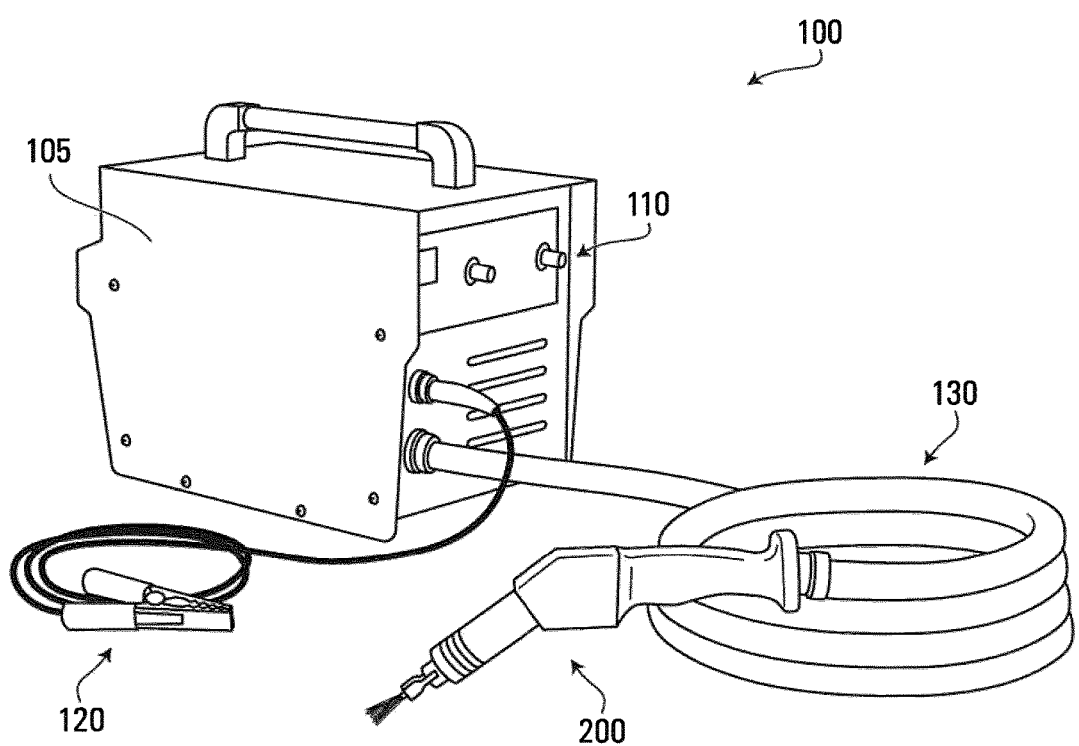
FIG. 1 shows an example of a weld cleaning system in which embodiments of the invention may be implemented in accordance with a specific example of implementation of the invention.

FIG. 1 shows a weld cleaning system 100 in which embodiments of the invention may be implemented. In general, the weld cleaning system 100 is used to remove/clean heat tint in the heat-affected zone of welded stainless steel products. In this embodiment, the weld cleaning system 100 includes a weld-cleaning machine 105, a control panel 110, a feed line 130, a ground connector 120, an end-piece 200 and a solutions reservoir (not illustrated).

The weld-cleaning machine 105 typically houses the operational components of the weld cleaning system 100. The weld-cleaning machine 105 is connected to a power supply by a power cord (e.g., an electrical outlet) and the operational components are controlled via the control panel 110 to supply the desired electrical output and optionally the solution from the solutions reservoir to the feed line 130.

The control panel 110 typically may include features such as a main power switch, amperage regulating switch, solution pump switch, end-piece selector switch and/or any other suitable feature.

The feed line 130 typically is used to provide electricity and optionally solution to the end-piece 200 from the weld-cleaning machine 105. Usually the intensity of the electrical current and the type of current, such as direct current (DC) or alternating current (AC) can be set as desired by the operator on the control panel 110.

In the case where the solution is supplied via a feed line 130 the weld-cleaning machine 105 usually includes a solutions reservoir. The solution is typically an electrolyte solution. The control panel 110 has controls to turn the solution pump on/off and to control the rate at which the solution is dispensed to the end-piece 200 via the feed line 130. Alternatively, the solutions reservoir may be located in the end-piece 200. For example, the solutions reservoir may be a replaceable solutions cartridge, which connects to the end-piece 200.

The ground connector 120 is used to ground the welded product being cleaned, by connecting the welded product to ground.

The end-piece 200 is handheld by the operator of the weld cleaning system 100 and has an attachment at the tip of the end-piece 200 to clean the weld. The end-piece 200 is also commonly referred to in the industry as a wand, a torch or a handpiece. The end-piece 200 may include an ON/OFF switch to turn on or off the electrical power and/or the solution flow through the tip of the end-piece 200. The end-piece 200 may also include a manually operated pump to dispense the solution, which is a useful option when it is not desirable to provide a powered solution pump in the weld cleaning machine 105. The end-piece 200 and the attachment at the tip of the end-piece 200 are discussed in further detail below.

It is appreciated that embodiments of the invention are not limited to the welding cleaning system 100. For example, weld-cleaning systems such as MINI SURFOX, SUR-FOXT™ 204 and SURFOX™ 104 provided by Walter Surface Technologies Inc. may be used with embodiments of the invention.

Figure 2A:
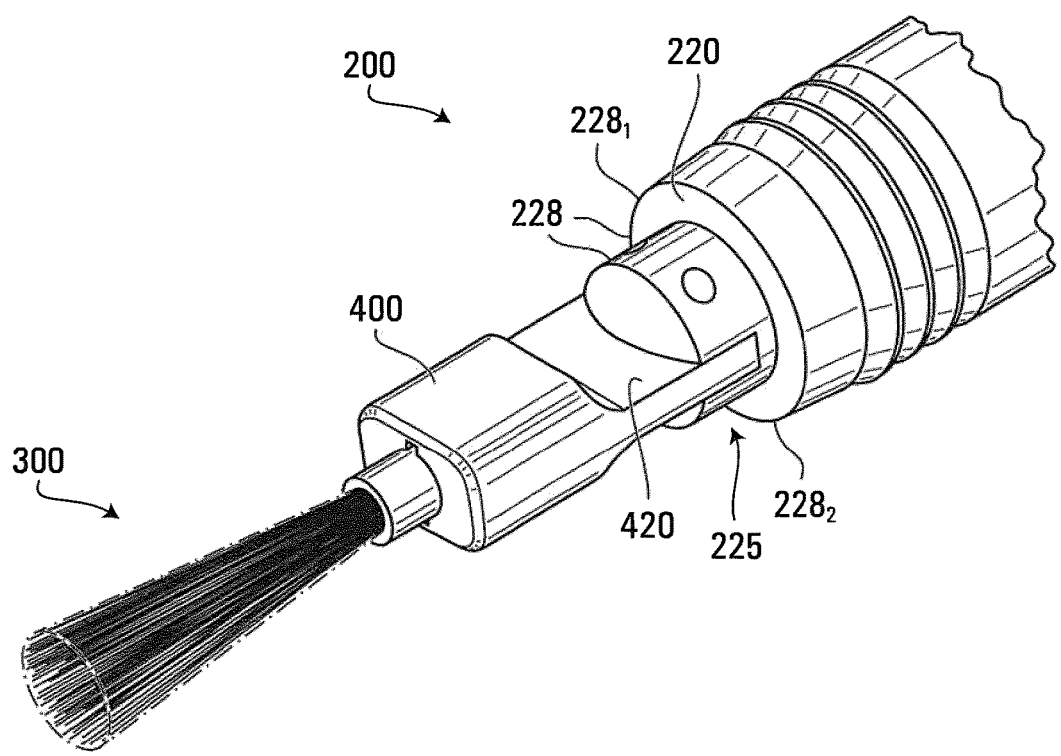
FIG. 2A is a perspective view of an assembly of an end-piece in accordance with an embodiment of the invention.

FIG. 2A is a perspective view of an assembly of the end-piece 200 in accordance with an embodiment of the invention. As illustrated, the end-piece 200 includes an end-piece body 210 (not pictured), a connection tip 220, a brush support 400 and a brush 300. The end-piece body 210 is typically made of a non-conductive material such as plastic, rubber or any other suitable material. In this example, the connection tip 220 extends out of the end-piece body 210 for connecting with the brush support 400. The connection tip 220 is made of a conductive material.

Figure 2B:
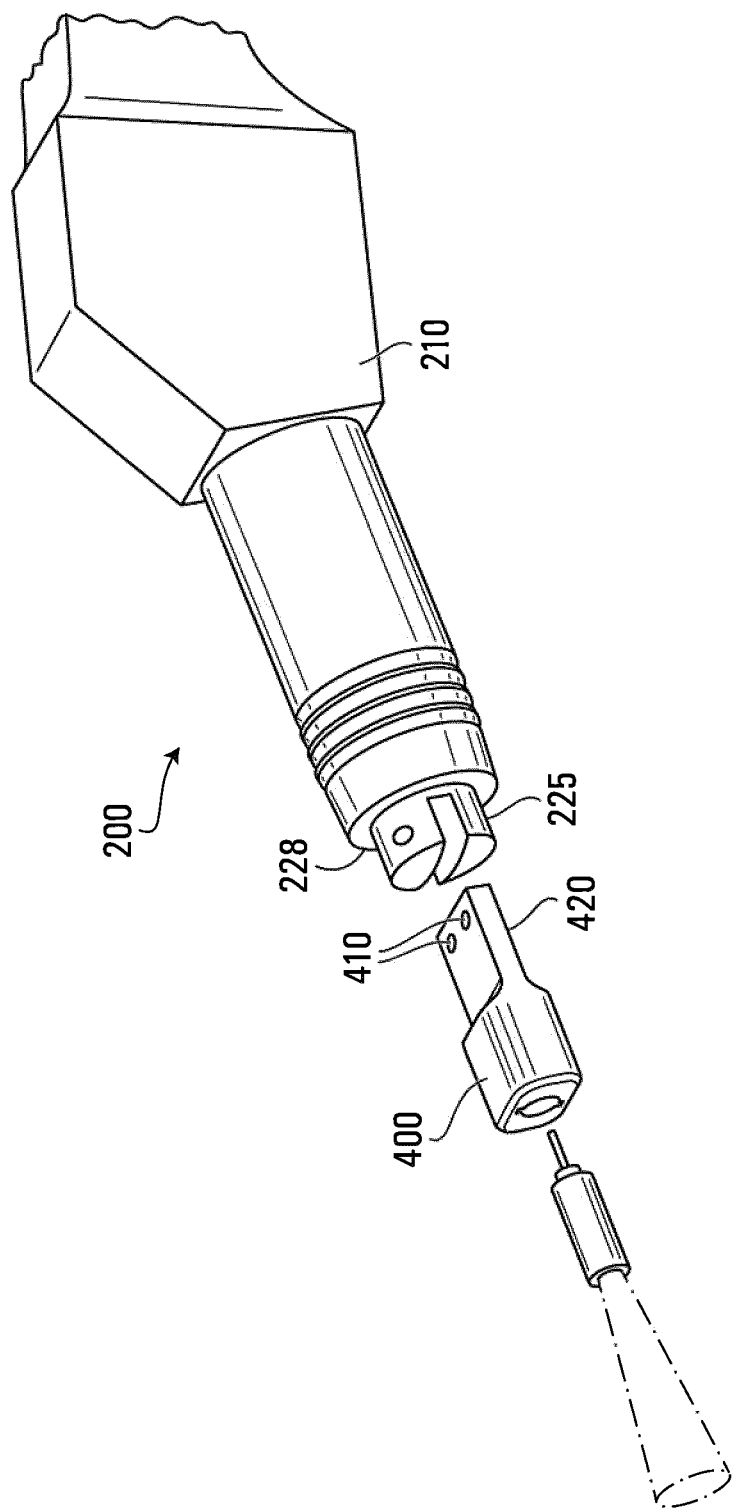
FIG. 2B is an exploded view of an assembly of the end-piece illustrated in FIG. 2A.

FIG. 2B is an exploded view of an assembly of the end-piece 200 illustrated in FIG. 2A. As illustrated, the connection tip 220 is connectable to the brush support 400, such that the brush support 400 can be securely fastened to the connection tip 220 and such that connection tip 220 is able to provide electricity and solution to the brush support 400. Similarly, the brush 300 is releasably connectable to the brush support 400.

As illustrated in both FIGS. 2A and 2B, the connection tip 220 includes a slot 225 for receiving the brush support 400. The brush support 400 includes a tip-connecting portion 420 which may be received in the slot 225 and fastened by fastening means. Such fastening means may include screws, nuts and bolts, pins or any other suitable component which is insertable into one or more holes 228 in the connection tip 220 which then engage one or more holes 410 in tip connecting portion 420. As illustrated, in this specific example, the tip connecting portion 420 includes two holes $410_1$ $410_2$ (see FIG. 4A) and the connection tip 220 includes two holes $228_1$ $228_2$ for receiving screws (not illustrated). In other embodiments, the brush support 400 may be connected to the connection tip 220 by other suitable means and the connection of the brush support 400 to the connection tip 220 should not be limited to these examples.

Figure 3A:
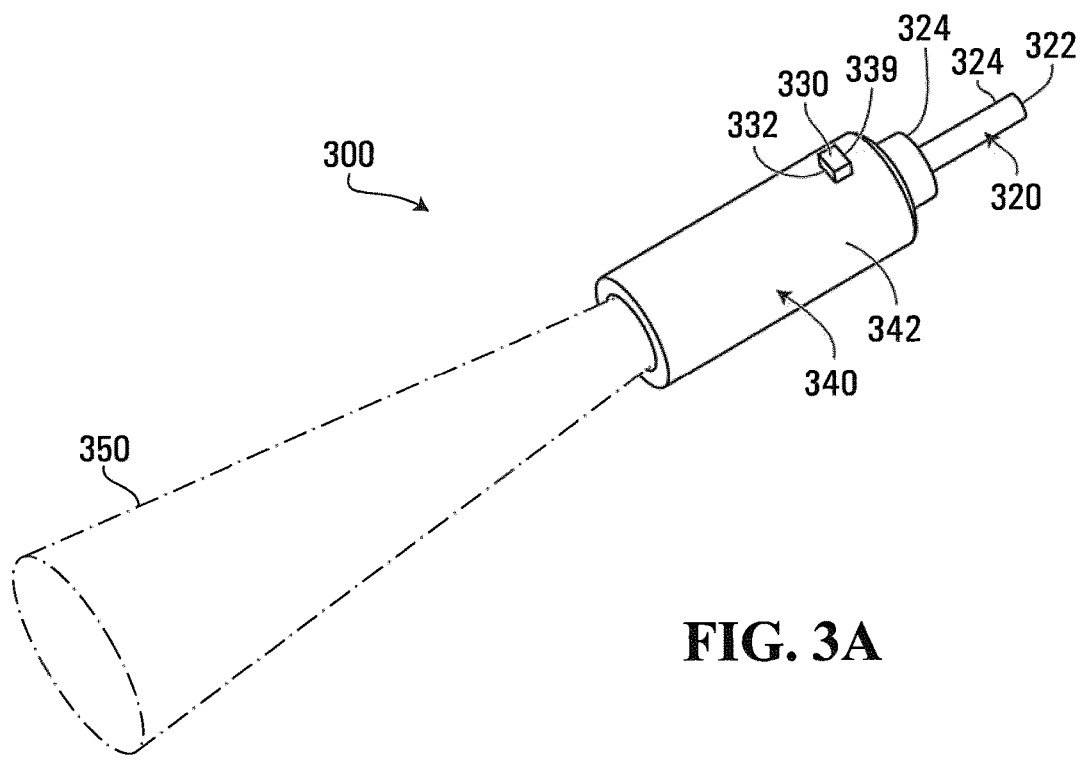
FIG. 3A is a perspective view of a brush in accordance with an embodiment of the invention.

FIG. 3A is an example of the brush 300 in accordance with an embodiment of the invention. The brush 300 includes bristles 350, a conductive connector 340 and a fluid conduit 320. The bristles 350 may be conductive carbon fiber bristles or any other suitable bristles made out of a conductive material. The bristles 350 are attached to the conductive connector 320 to establish electric contact with the latter. For example, the bundle of bristles 350 is inserted into the conductive connector 340 and the conductive connector 340 is crimped to mechanically fasten the bristles 350 while allowing current flow to the bristles 350. The conductive connector 340 may be made of any suitable conductive material, such as metal. The conductive connector 340 of the brush 300 is configured such that it is connectable to the brush support 400. For instance, the brush conductive connector 340 may include one or more lugs 330 which may be used to releasably secure the brush to the brush support 400. Although in FIG. 3A only a single lug $330_1$ is visible, it is appreciated that in this specific example two lugs $330_1$ and $330_2$ are positioned on the conductive connector 340 (as illustrated in FIG. 2B). The conductive connector 340 also has a surface 342 of a generally circular shape. In this embodiment, the conductive connector 340 is tubular having a passage for the fluid conduit 320. In general, the fluid conduit 320 establishes a fluid path from the brush support 400 to the bristles 350. The fluid conduit 320 includes a tubular portion 321 with a fluid inlet 332 that is able to receive fluid from the brush support 400. The fluid conduit 320 is typically made of a non-conductive material, such as plastic or rubber.

Figure 3B:
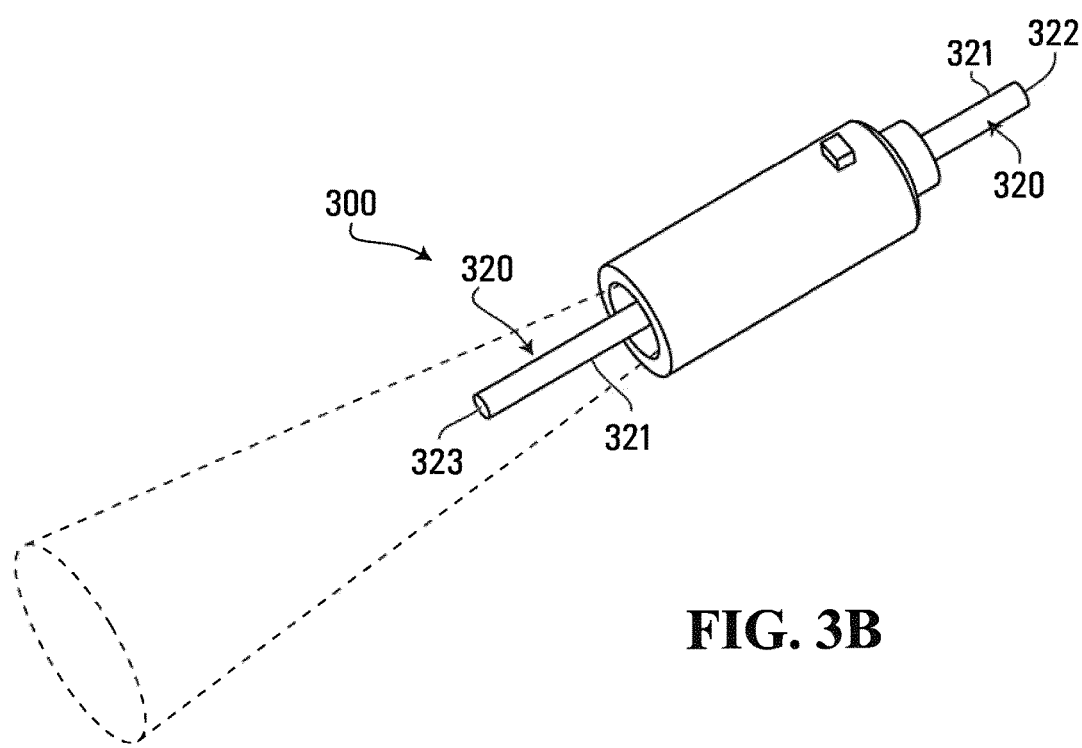
FIG. 3B is a perspective view of the brush illustrated in FIG. 3A where the bristles pad is shown in a see-through layout for clarity.

FIG. 3B illustrates the brush 300 with the bristles 350 omitted, a dotted line being provided to show the outline of the bristles. As illustrated in FIG. 3B, the fluid conduit 320 extends through the conductive connector 340 and into area where the bristles 350 would typically be located. The tubular portion 321 of the fluid conduit 320 extends through the conductive connector 340 and into the area of the bristles 350. Such a configuration distributes fluid that is received in the fluid inlet 322 of the fluid conduit 320 to the bristles of the brush.

Figure 4A:
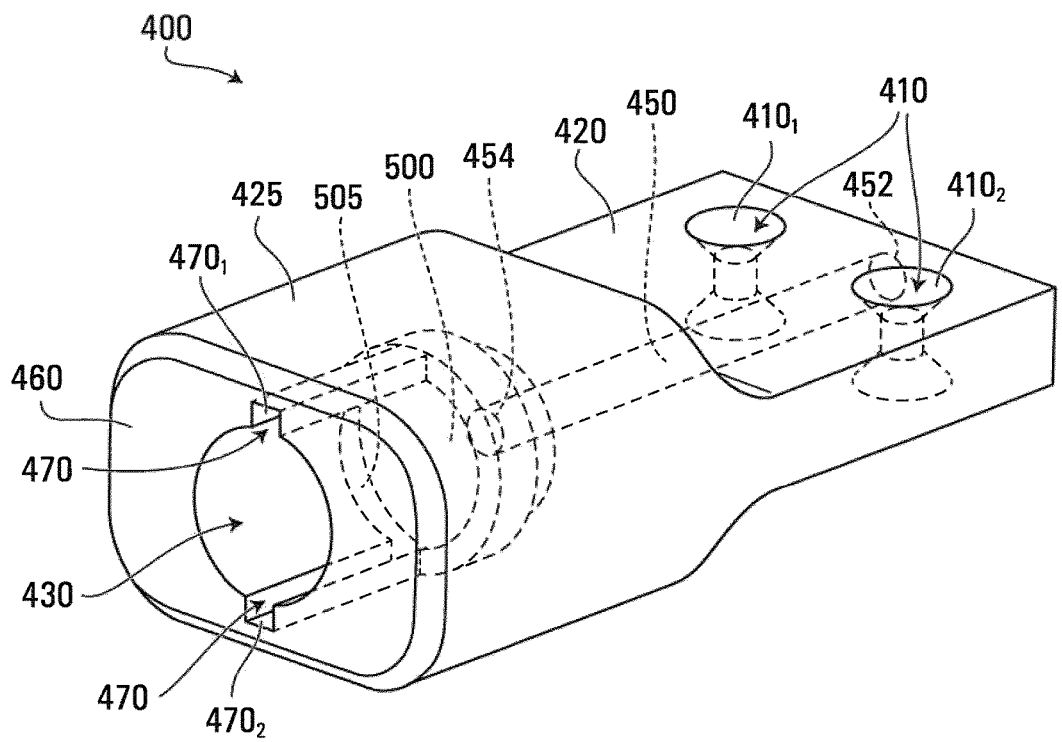
FIG. 4A is a perspective view of a brush support in accordance with an embodiment of the invention.

FIG. 4A is an example of the brush support 400 in accordance with an embodiment of the invention. The brush support 400 provides a fluid path between the end-piece body 210 and the brush 300. More specifically, the brush support 400 includes a tip connecting portion 420, a brush-connecting portion 425 and a fluid passageway 450. The brush support 400 (including the tip connecting portion 420 and the brush connecting portion 425) is typically constructed as a single piece made out of a conductive material, such as metal.

As previously discussed, the tip connection portion 420 is connectable to the connection tip 220. As illustrated in FIG. 4A, one or more holes 410 may be provided on the tip-connecting portion 420. The position of the one or more holes 410 is such that when the tip connecting portion 420 is received in the slot 225 of the connection tip 220, the one or more holes 410 register with the one or more holes 228 of the connection tip 220. When in alignment the one or more holes 410 and the one or more holes 228 would then allow for the connection tip 220 and the brush support 400 to be secured to each other by fasteners such as screws.

Figure 4B:
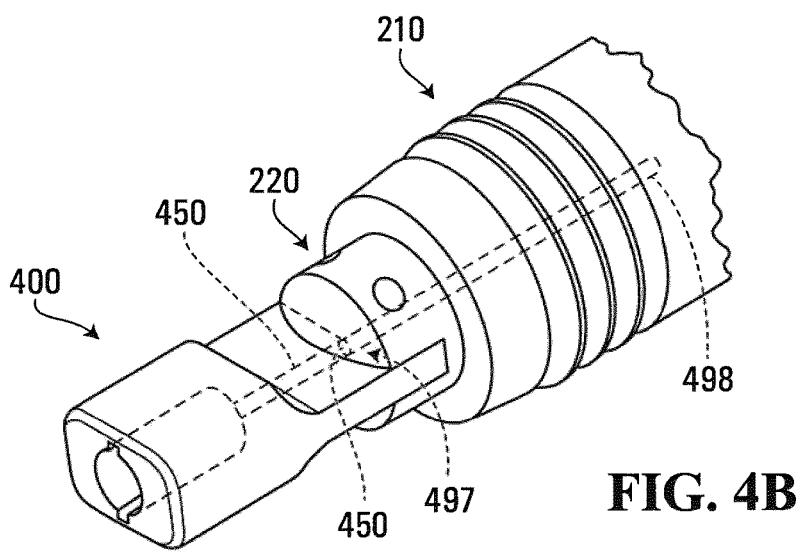
FIG. 4B is a perspective view of the brush support and a connection tip in accordance with an embodiment of the invention.

As illustrated in FIG. 4B, the fluid passageway 450 includes an fluid inlet 452 in the tip connecting portion 420, such that when the tip connecting portion 420 is secured to the connection tip 220, the fluid inlet 452 aligns with a fluid outlet 497 in the connection tip 220, such that the connection tip 220 is able supply fluid to the brush support 400. In other words, the brush support 400 is able to obtain fluid from the connection tip 220 of the end-piece body 210, as the fluid outlet 497 in the connection tip 220 is connected by an end-piece fluid passageway 498 to the solution reservoir, for example, via the feed line 130.

The brush connecting portion 425 includes an opening 430 for receiving the brush 300. The opening 430 provides a substantially circular passage 505 to a cavity 500, where the cavity 500 is connected to the fluid passageway 450. In other words, a continuous aperture is provided in the brush support 400 from the opening 430 on the brush-connecting portion 425 to the fluid inlet 452 on the tip connecting portion 420. Thus, when the brush 300 is connected to the brush support 400 a fluid connection is also made. The circumference of the substantially circular passage 505 is slightly larger than the circumference of the surface 342 of the conductive connector 340, such that at least part of the conductive connector 340 is able to fit inside and make contact with the substantially circular passage 505. Thus, when the conductive connector 340 makes contact with the substantially circular passage 505 (and the brush support 400 in general) an electrical connection is made, which may allow for the supply of electricity from the brush support 400 to the brush 300.

Connecting the Brush to the Brush Support

An example of the process of connecting the brush 300 to the brush support 400 will now be discussed in further detail with references to FIGS. 4A, 5A, 5B, 5C and 5D.

One or more recesses 470 extend along the length of substantially circular passage 505 from the opening 430 to the cavity 500. In the example illustrated, two recesses 470 are shown. The two recesses 470 are located opposite to each other. The recesses 470 have straight segments running to the bottom of the circular passage 505, where they change direction and extend peripherally along the inner wall of the circular passage 505. Each recess 470 runs peripherally over an arc of circle bound by an angle which is less than 180 degrees. The recesses 470 are configured such that they are able to receive respective lugs 330 on the brush 300 in a way such that the one or more lugs 330 can move along respective one or more recesses 470 when the brush is inserted into the opening 430. As illustrated in FIG. 4A, two recesses $470_1$ $470_2$ are provided, such that the two recesses $470_1$ $470_2$ are able to receive the respective lugs $330_1$ $330_2$ when the brush 300 is inserted into the opening 430 of the brush support 400. Essentially, the recesses 470 and the lugs 330 constitute a quick connect attachment system allowing to secure the brush 300 to the brush support 400 by inserting the brush 300 in the brush support 400 and then twisting the brush 300 to lock it in place.

Figure 5A:
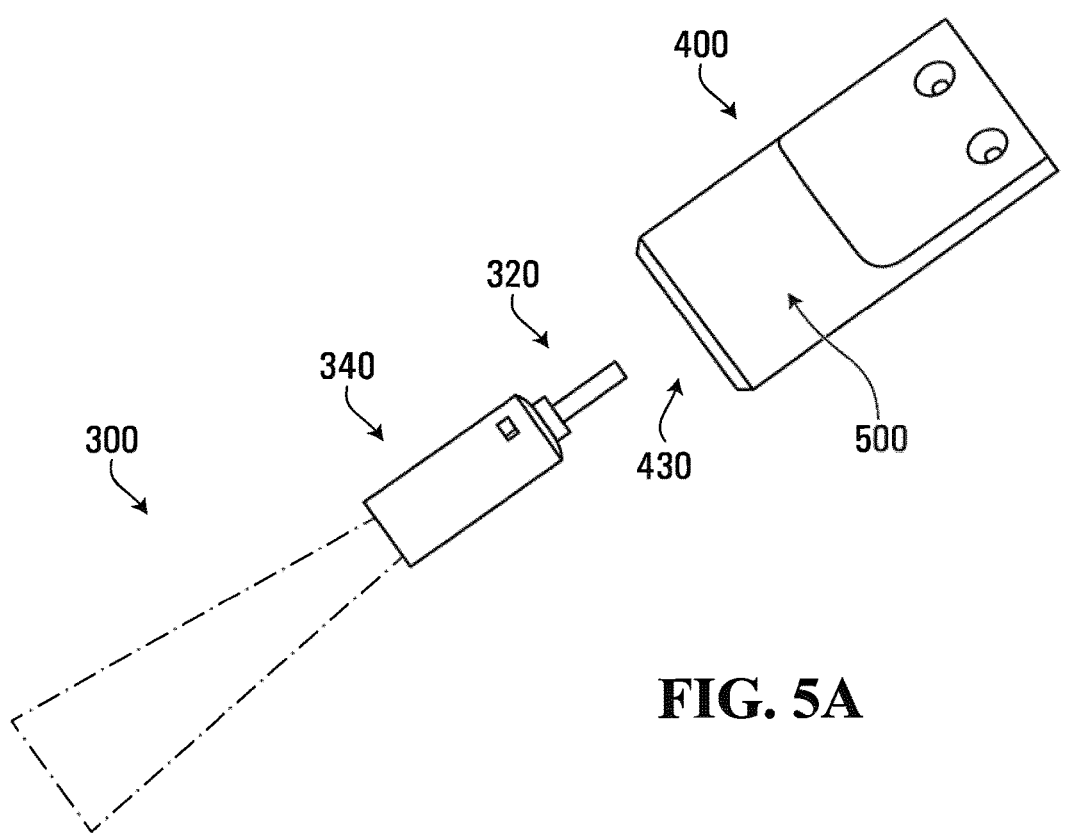
FIGS. 5A, 5B, 5C and 5D are perspective views of the brush, illustrating the process for inserting the brush into the brush support in accordance with an embodiment of the invention.

In FIG. 5A the brush 300 is positioned so the fluid inlet 322 of fluid conduit 320 and conductive connector 340 align with the opening 430 of the brush support 400. The two recesses $470_1$ $470_2$ also align with the respective lugs $330_1$ $330_2$ and then a force may be applied in the direction of the arrow in FIG. 5A to start the insertion of the brush 300 into to the brush support 400.

Figure 5B:
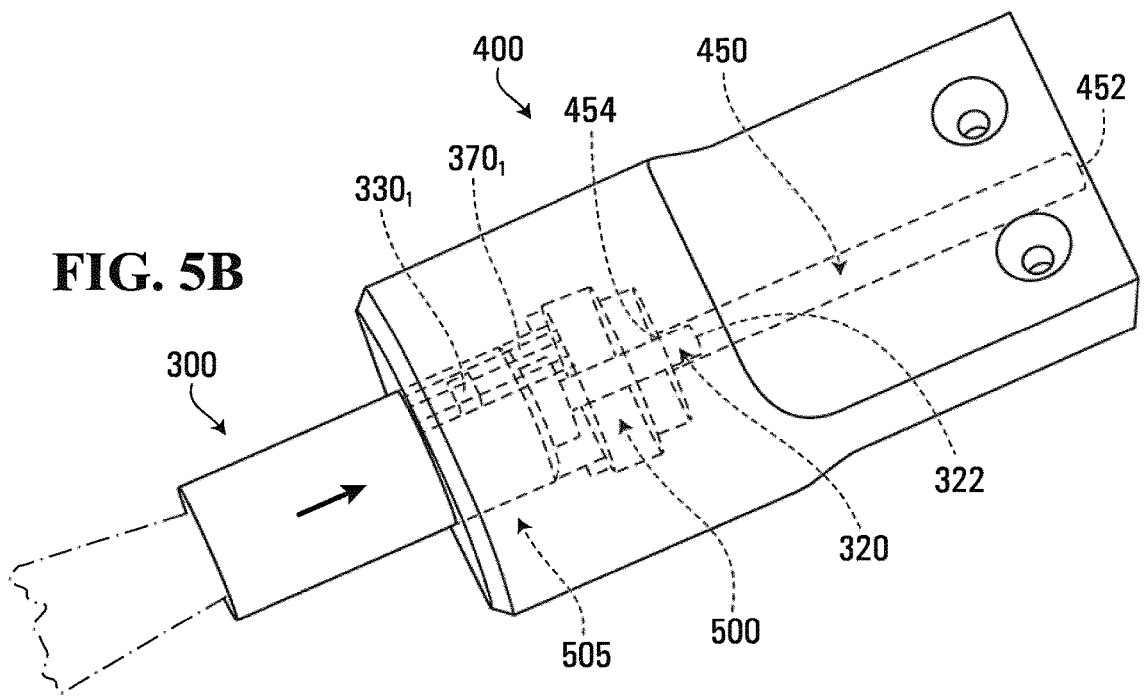

FIG. 5B illustrates the partial insertion of the conductive connector 340 and full insertion of the fluid inlet 322 of fluid conduit 320 through the opening 430 of the brush support 400. As illustrated, the fluid inlet 322 is fully received into the brush support 400 such that fluid inlet 322 has moved past the circular passage 505 and the cavity 500 and engages (e.g., inserted into) a fluid outlet 454 on the fluid passageway 450. As the brush 300 is inserted into the brush support 400 the two lugs $330_1$ $330_2$ move along the respective two recesses $470_1$ $470_2$, which prevents the rotation of the brush 300.

Figure 5C:
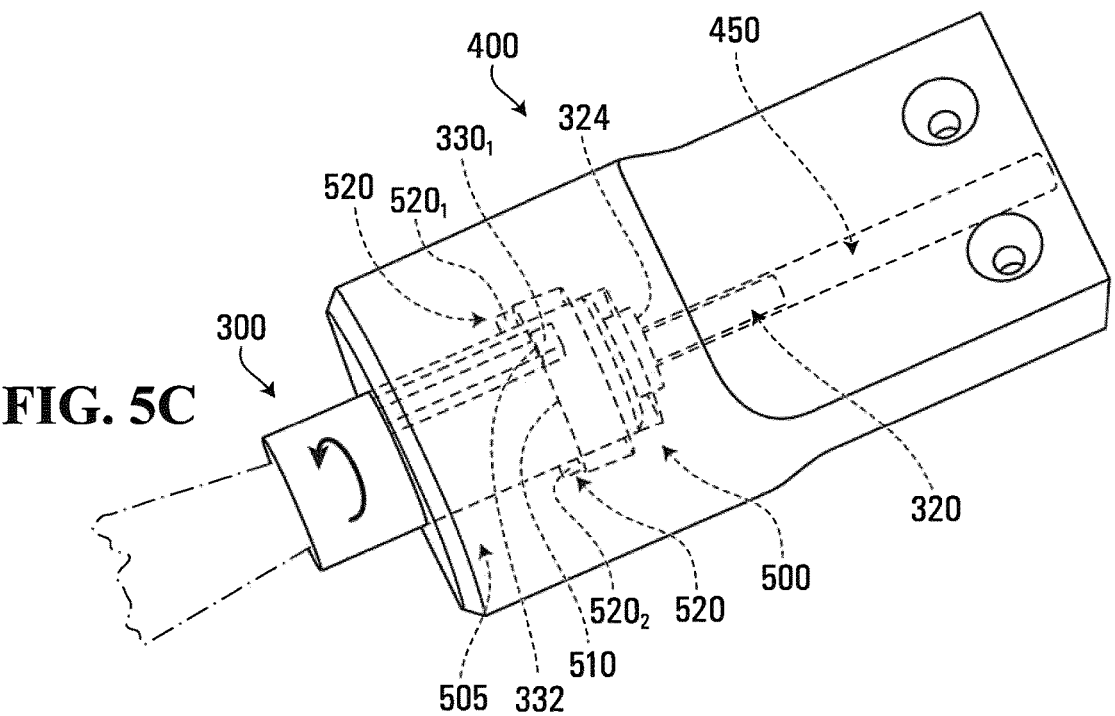

FIG. 5C illustrates the brush 300 inserted to a point where the lugs $330_1$ $330_2$ enter the cavity 500 which is defined by the arcuate portions of recesses $470_1$ $470_2$. At this point, the brush 300 may then be rotated in the direction of the arrow illustrated in FIG. 5C (counter clockwise) to lock it in place. In general, the brush 300 is rotated until the one or more lugs 330 align with respective one or more grooves 520. In this specific example, the brush 300 is rotated approximately 90 degrees until the two lugs $330_1$ $330_2$ align respectively with the two groves $520_1$ $520_2$. During this rotation process the fluid inlet 322 remains engaged in the fluid passageway 450.

Figure 5D:
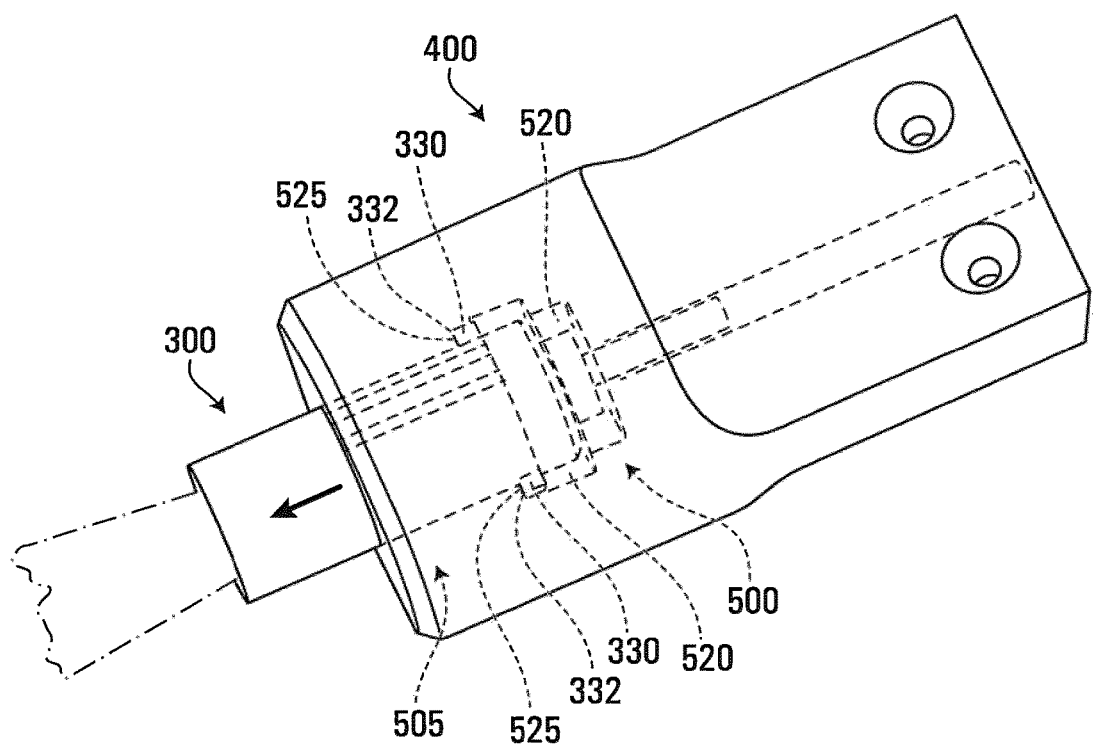

Once the one or more lugs 330 align with the respective one or more grooves 520, then as illustrated in FIG. 5D, the brush can slightly recede out of the brush support allowing the lugs 330 to engage the respective grooves 520. The engagement of the lugs 330 in the respective grooves 520 locks the brush 300 against accidental rotation keeping the brush in place. Furthermore, when the lugs 330 engage the respective grooves 520 the fluid conduit 320 remains engaged in the fluid passageway 450.

An option is to provide a resilient member, such as coil spring in the cavity 505, that urges the brush 300 out of the brush support 400 such that the lugs 330 remain locked in the grooves 520. To remove the brush 300 from the brush support 400, the user must first press in the brush 300 to overcome the resiliency of the spring and bring out the lugs 330 out of the grooves 520, then twist the brush and pull it out.

The above arrangement allows the brush to be conveniently removed from the brush support for replacement when the brush is worn out or for replacement with a different style brush to better fit a particular job. The releasable connection, in addition to mechanically fastening the brush to the brush support also creates an electric contact for current flow and also a fluid connection for solution to be dispensed to the brush.

Various Sized Brushes

Although in the embodiments previous discussed only a single sized brush 300 was described brushes of different sizes may be used in some embodiments. For example, a small brush, a medium brush and a large brush may be interchangeably used where the size of the brush in general corresponds to the surface area covered by the bristles of brush.

Multiple Brushes

Similarly, although in the embodiments previous discussed only a single brush 300 was described multiple brushes (i.e., a plurality) may be used in some embodiments.

Figure 6A:
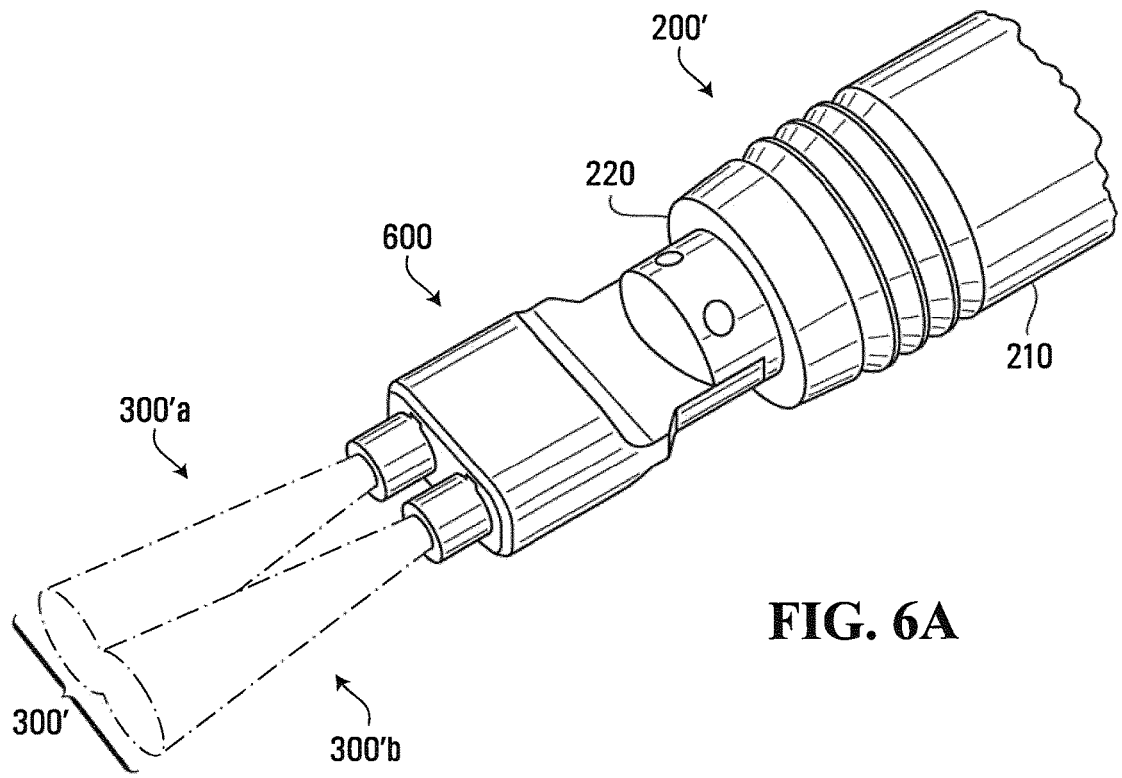
FIG. 6A is a perspective view of an assembly of an end-piece of a dual brush arrangement in accordance with an embodiment of the invention.

FIG. 6A is an example of an assembly of an end-piece 200' for use with two brushes 300 in accordance with an embodiment of the invention. For ease of reference, in discussing the various implementations, a "prime" (') indicator may be included on previously introduced reference characters to indicate a variant of the previously introduced element or embodiment. The end-piece 200' comprises similar elements to that of the end-piece 200 and the end-piece 200' functions in a similar manner to that of the end-piece 200. The main different in the end-piece 200' when compared with the end-piece 200 is that a brush support 600 for use with up to two brushes 300' is provided instead of the brush support 400 for a single brush 300.

Figure 6B:
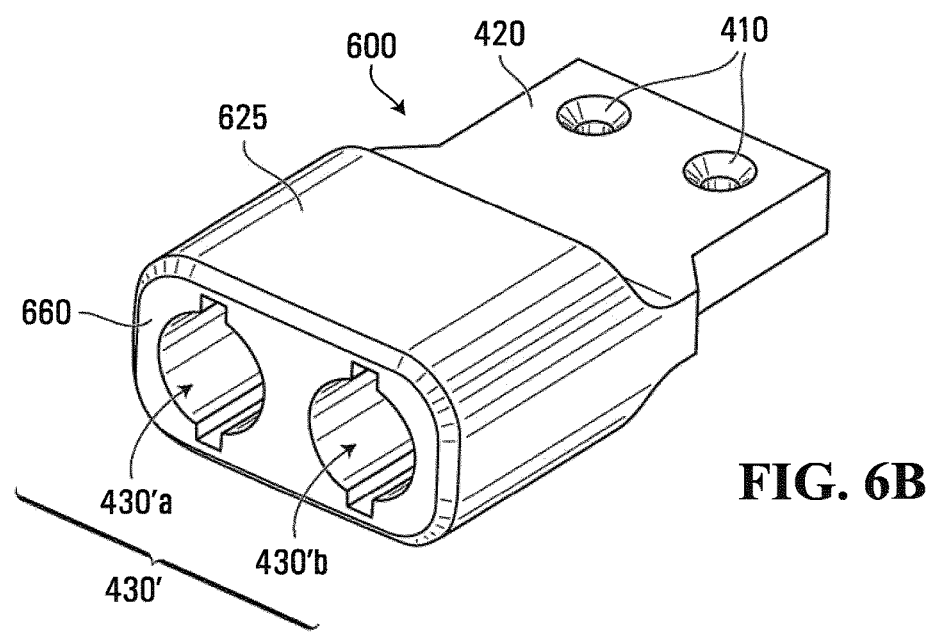
FIG. 6B is a perspective view of a brush support for a dual brush arrangement in accordance with an embodiment of the invention.

FIG. 6B is an example of the brush support 600 for use with the two brushes 300' in accordance with an embodiment of the invention. Similar to the brush support 400, the brush support 600 is connectable with the connection tip 220 of the end-piece body 210. More specifically, the brush support 600 includes one or more holes 410 and a tip connection portion 420 which may be fastened to the connection tip 220 as previously discussed in relation to the brush support 400. A brush connecting portion 625 is provided which allows for the connection of one or two brushes. The brush connecting portion 625 is similar to the brush connecting portion 425. However, the brush connecting portion 625 includes two opening 430' for receiving up to two brushes 300'. More specifically, a first opening $430_a'$ and a second opening $430_b'$ is provided, where each of said openings have similar components and function in a similar fashion to the opening 430. Although not illustrated in FIGS. 6A and 6B, the fluid provided to the brush support 600 is distributable to the two brushes 330'. For example, a T-joint may split the fluid received at a fluid inlet of the brush support 600 and distribute it to two fluid outlets. The use of T-joints to distribute fluid in the brush support is discussed in further detail elsewhere in this document.

Figure 7A:
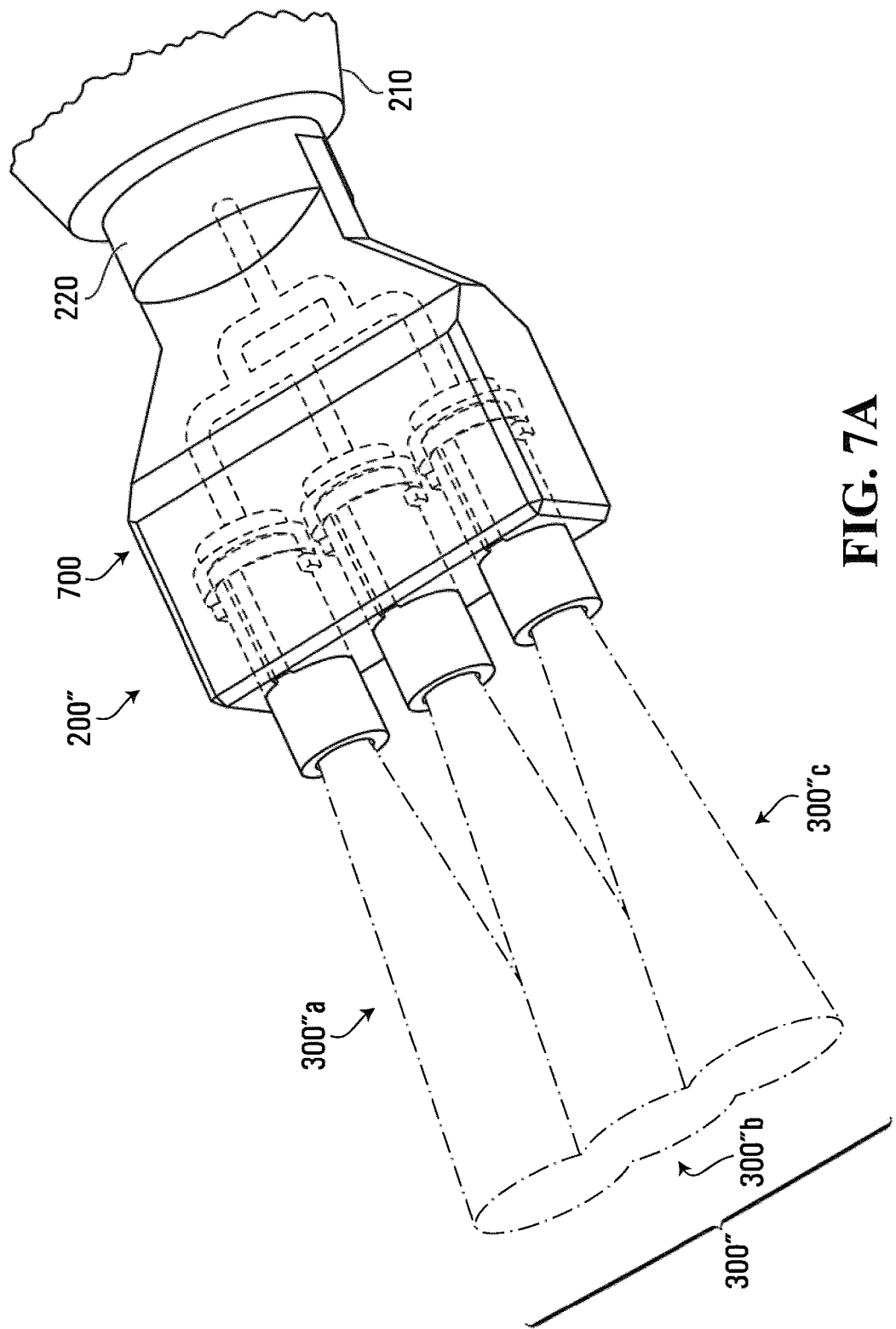
FIG. 7A is a perspective view of an assembly of an end-piece of a triple brush arrangement in accordance with an embodiment of the invention.

FIG. 7A is an example of an assembly of an end-piece 200" for use with three brushes 300" in accordance with an embodiment of the invention. The end-piece 200" comprises similar elements to that of the end-piece 200 and the end-piece 200" functions in a similar manner to that of the end-piece 200. The main different in the end-piece 200" when compared with the end-piece 200 is that a brush support 700 for use with up to three brushes 300" is provided instead of the brush support 400 for a single brush 300.

Figure 7B:
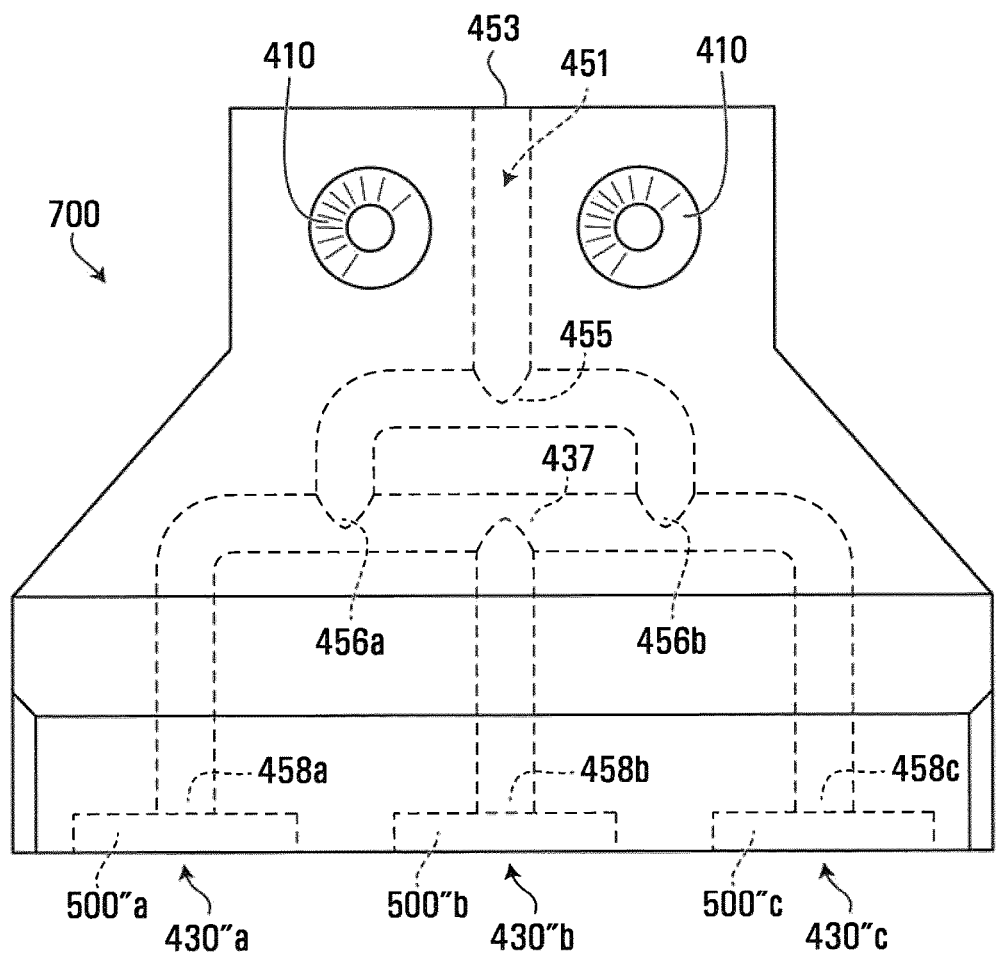
FIG. 7B is a perspective view of a brush support for use with the triple brush arrangement in accordance with an embodiment of the invention.

FIG. 7B is an example of the brush support 700 for use with the three brushes 300" in accordance with an embodiment of the invention. Similar to the brush support 400, the brush support 700 is connectable with the connection tip 220 of the end-piece body 210. More specifically, the brush support 700 includes one or more holes 410 and a tip connection portion 420 which may be fastened to the connection tip 220 as previously discussed in relation to the brush support 400. A brush connecting portion 725 is provided which allows for the connection of one, two or three brushes. The brush connecting portion 725 is similar to the brush connecting portion 425. However, the brush connecting portion 725 includes three opening 430" for receiving up to three brushes 300". More specifically, a first opening $430_a"$, a second opening $430_b"$ and a third opening 430" is provided, where each of said openings have similar components and function in a similar fashion to the opening 430. As illustrated in FIG. 7B, the brush support 700 includes a fluid inlet 453 connected to a fluid passageway 451, which functions similar to the fluid inlet 452 and the fluid passageway 450 in the brush support 400. In this embodiment, a first T-joint 455 is provided which is able to distribute fluid in the passageway 450 to a second set of T-joints $456_a$ $456_b$. The second set of T-joints $456_a$ $456_b$ is then able to distribute fluid in the passageway 450 to the three fluid outlets $458_a$, $458_b$ and $458_c$. As illustrated, an additional T-joint 457 is provided such that the three fluid outlets $458_a$, $458_b$ and $458_c$ are able to receive fluid from either of the second set of T-joints $456_a$ $456_b$. The three fluid outlets $458_a$, $458_b$ and $458_c$ function in a similar way to the fluid outlet 454; that is, the three fluid outlets $458_a$, $458_b$ and $458_c$ are engageable with respective fluid inlets of fluid conduits of the set of brush 300".

In the embodiments of FIGS. 6A, 6B, 7A and 7B, the brush support 600 and the brush support 700 where both configured such that the brushes would be positioned laterally beside each other. However, the positioning of the brushes need not be in such a lateral configuration and there are many different ways the brushes may be positioned. By way of a non-limiting example, the assembly of an end-piece 200'" illustrated in FIG. 8A and the brush support 800 illustrated in FIGS. 8A and 8B is an example of a different way the brushes 300'" may be positioned in the brush support 800.

Figure 8A:
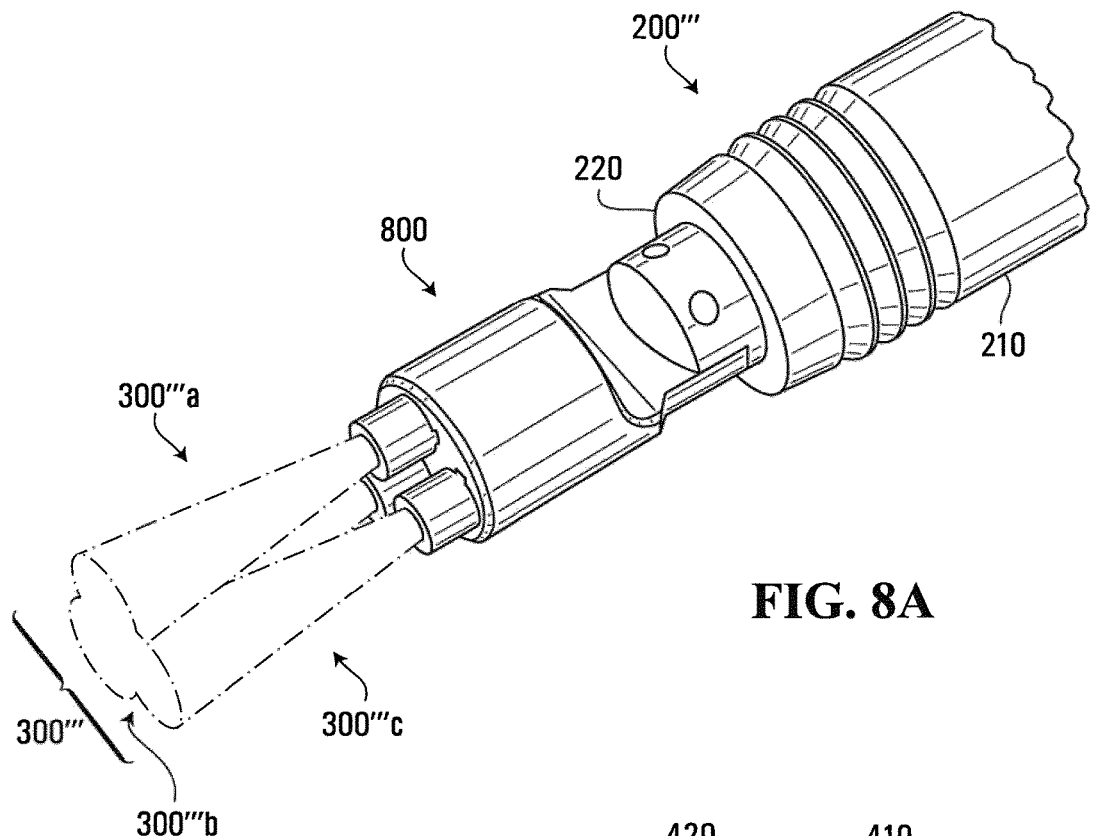
FIG. 8A is a perspective view of an assembly of a triple brush end-piece where the brushes are arranged in a triangular configuration in accordance with an embodiment of the invention.

FIG. 8A is an example of an assembly of an end-piece 200'" for use with three brushes in a triangular configuration 300" in accordance with an embodiment of the invention. The end-piece 200" comprises similar elements to that of the end-piece 200" and the end-piece 200'" functions in a similar manner to that of the end-piece 200'". The main different in the end-piece 200'" when compared with the end-piece 200" is that the brush support 800 positions the brushes 300" in a triangular configuration.

Figure 8B:
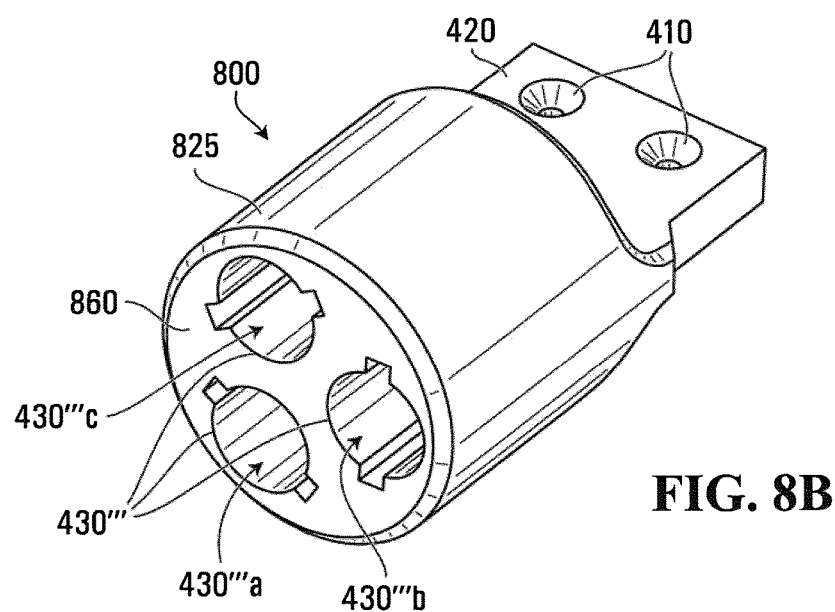
FIG. 8B is a perspective view of a brush support for use with the triple brush arrangement of FIG. 8A.

FIG. 8B is an example of the brush support 800 for use with the three brushes 300" in a triangular configuration in accordance with an embodiment of the invention. Similar to the brush support 700, the brush support 800 is connectable with the connection tip 220 of the end-piece body 210. More specifically, the brush support 800 includes one or more holes 410 and a tip connection portion 420 which may be fastened to the connection tip 220 as previously discussed. A brush connecting portion 825 is provided which allows for the connection of one, two or three brushes. The brush connecting portion 825 is similar to the brush connecting portion 725. As illustrated, the brush connecting portion 825 is circular in shape and a first opening $430_a'''$, a second opening $430_b'''$ and a third opening $430_b'''$ are provided in a triangular positioning, where each of said openings have similar components and function in a similar fashion to the opening 430. Similar to the brush support 700, the brush support 800 includes a fluid passageway which may be configured by use of a plurality of T-joints which are able to distribute fluid in the fluid passageway to fluid outlets which are engageable with fluid inlets of the brushes 300'".

In the embodiments discussed in FIGS. 2A, 2B, 6A, 6B, 7A, 7B, 8A and 8B the end-piece body 210 and the connection tip 220 remain the same—it is only the brush supports 400 600 700 800 that change. In other words, the brush support end-piece body interface remains the same such that the end-piece body 210 can receive multiple brush support styles. The connection of brushes 300' 300" 300" in the embodiments discussed in FIGS. 6A, 6B, 7A, 7B, 8A and 8B can be connected to the brush supports 600 700 800 similar to the process discussed in regard to connecting the brush 300 to the brush support 400 and as illustrated in FIGS. 5A to 5D.

It is appreciated that the use of multiple brushes in the weld cleaning system 100 may allow for the current supplied to be distributed over the multiple brushes, which may result in an increased lifetime of the brushes when compared to an equivalent single brush system.

Plug & Sensors

Figure 9:
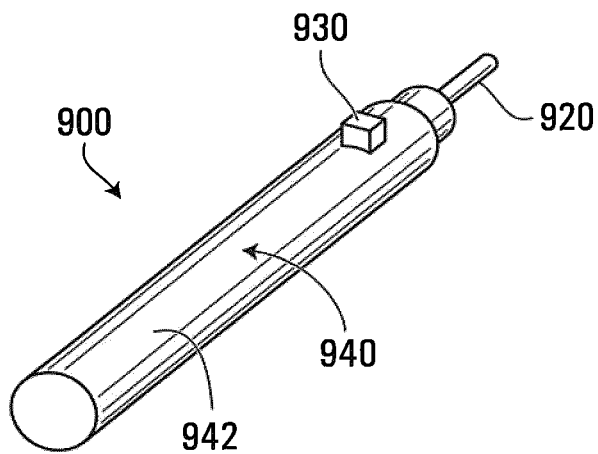
FIG. 9 is a perspective view of a plug in accordance with an embodiment of the invention.

FIG. 9 illustrates an example of a plug 900 in accordance with an embodiment of the invention. The plug 900 includes a plug body 940, which has a surface 942 of a generally circular shape. The plug also includes one or more lugs 930. Although in FIG. 9 only a single lug 930 is visible, it is appreciated that in this specific example two lugs are positioned on the plug body 940. Similar to how the brush 300 is insertable into the openings of the brush supports 600 700 or 800, the plug 900 can be inserted into one of the openings of the brush supports 600 700 or 800. The plug also includes a fluid passageway blocker 920 which is used to block the flow of fluid out of the fluid passageway in the brush support. More specifically, the fluid passageway blocker 920 would engage the fluid outlet in the brush support. The purpose of the plug 900 is that an operator that is cleaning a weld with one of the supports 600 700 or 800 may remove one of the brushes from the set of brushes being used and replace it with the plug 900 and then still be able to cleaning the weld with one less brush without having to change the brush support.

Sensors may be located in the brush support 400 600 700 or 800 for detecting whether a brush 300 or plug 900 is inserted. For instance, the small sensor may be positioned in the substantially circular passage 505 or the cavity 500 such that when the conductive connector 340 or plug body 940 makes contact with the substantially circular passage 505 the sensor detects that a brush 300 or plug 900 is inserted. A feedback signal could then be provided from the sensors to weld cleaning machine 105 to indicate that a brush 300 or plug 900 is missing and prevent operation of the weld cleaning system 100.

Sensors may also be positioned in the brush supports 400 600 700 or 800 to detect the lack of solution flow in the brush supports and to generate a feedback signal to stop the weld cleaning machine 105.

In other embodiments the brush support 400 600 700 or 800 may include a check valve which prohibits the flow of fluid if a brush 300 or plug 900 is not inserted into the brush support.

Bristle Pad Support Attachment

Figure 10:
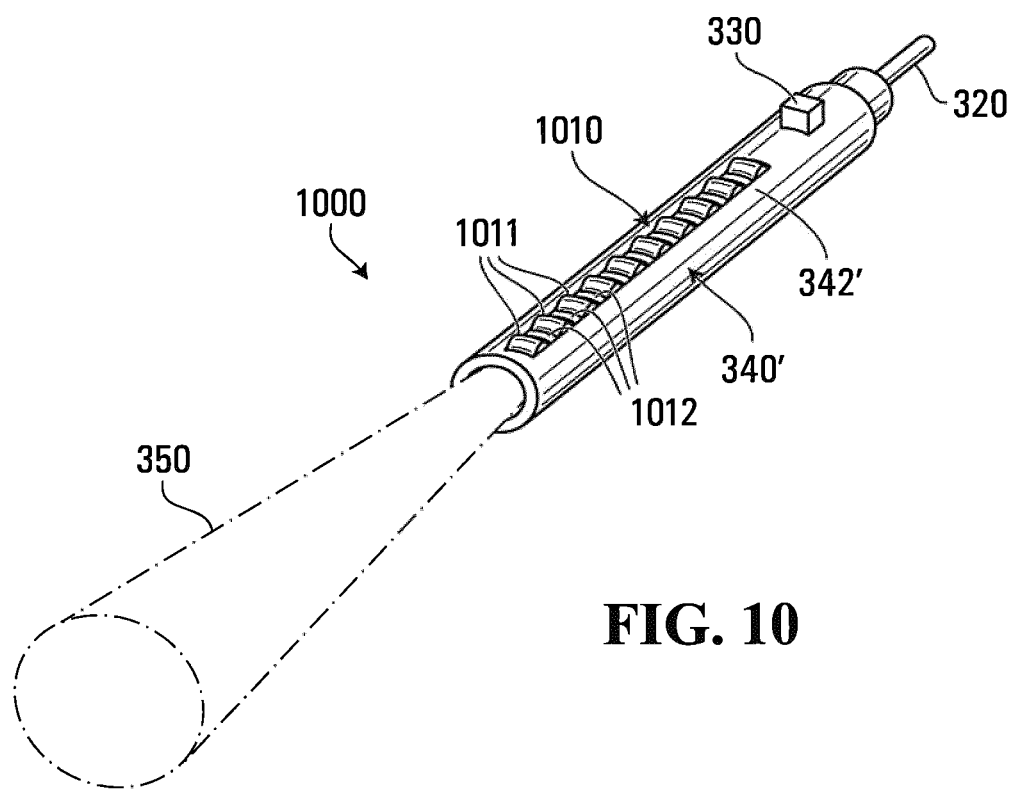
FIG. 10 is a perspective view of an adjustable brush.

FIG. 10 is an example of a brush 1000 in accordance with an embodiment of the invention. The brush 1000 is a variant of the brush 300 and the brush 1000 functions in a similar fashion and has similar components to that of the brush 300. The main difference between the brush 1000 and the brush 300 is that the brush 1000 includes a mounting member 1010 on the surface 342' of the conductive connector 340'. The general purpose of the mounting member 1010 is for holding in place a bristle pad support attachment which may be displaceably mounted on the conductive connector 340'. In this example, the mounting member 1010 is serrated; having a series of peaks 1011 and crevasses 1012.

Figure 11A:
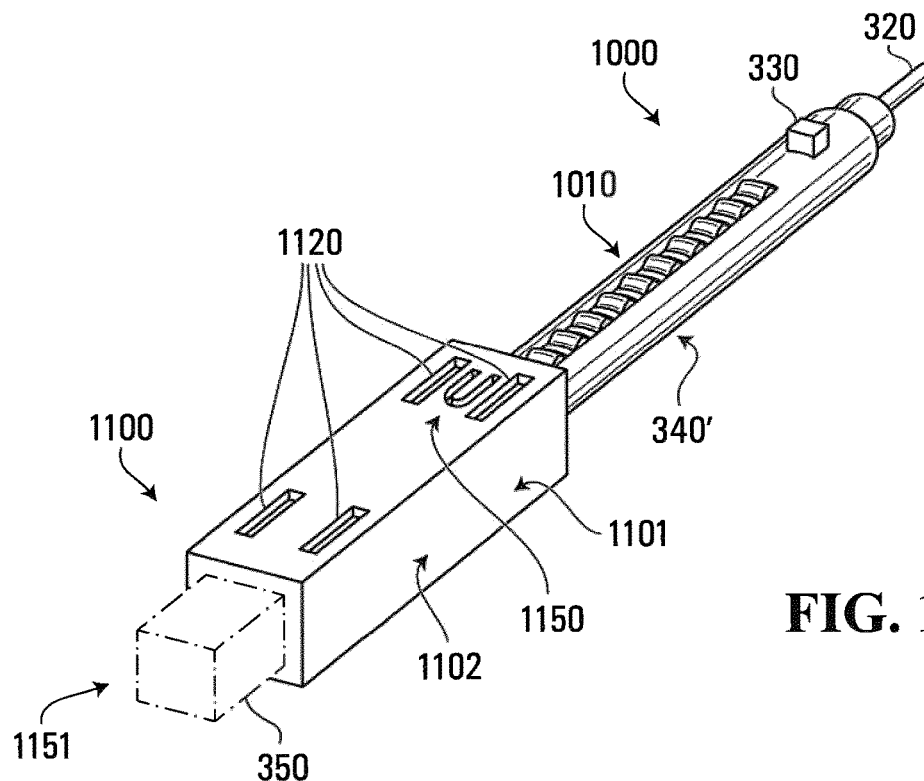
FIG. 11A is a perspective view of the brush and a bristles pad positioning attachment in accordance with an embodiment of the invention.

FIG. 11A is an example of the brush 1000 and a bristle pad support attachment 1100 in accordance with an embodiment of the invention. The bristle pad support attachment 1100 is made of a non-conductive material such as rubber or plastic. The bristle pad support attachment 1100 has two mating pieces a first piece 1101 and a second piece 1102.

Figure 11B:
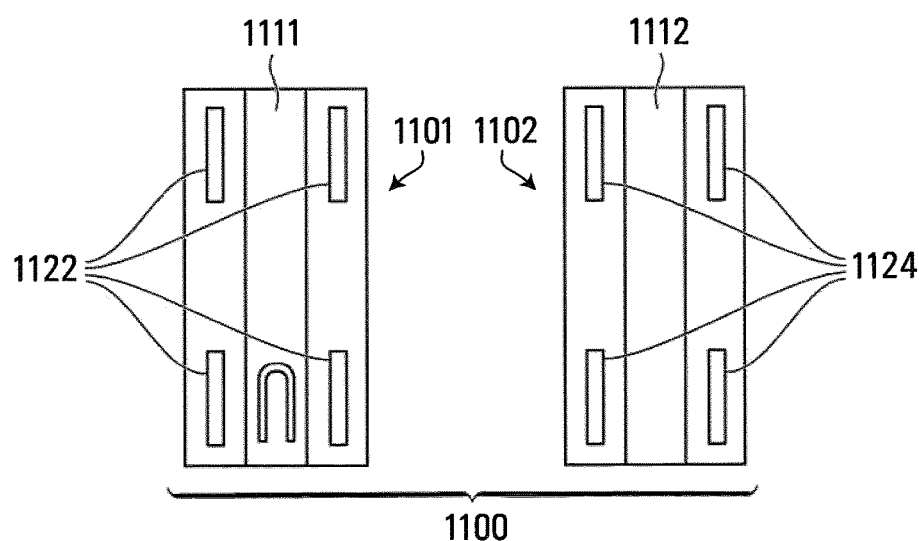
FIG. 11B illustrates the bristles pad positioning attachment where the first piece and the second piece are not attached to each other.

FIG. 11B illustrates the bristle pad support attachment 1100 where the first piece 1101 and the second piece 1102 are separated from each other. The first piece 1101 has a series of projections 1122 and the second piece 1102 has a series of grooves 1124. The first piece 1101 can be connected to the second piece 1102 by aligning the series of projections 1122 with the series of grooves 1124 and pushing the first piece 1101 and the second piece 1102 together such that the projections 1122 and grooves 1124 engage each other. It is appreciated that such a configuration allows for the bristle pad support attachment 1100 to be assembled by pacing the pieces 1101 and 1102 on either side of the bristles pad and then clipping them together.

The first piece 1101 and the second piece 1102 both have a generally U-shaped cavity 1111 and 1112, respectively. The U-shaped cavities 1111, 1112 extend along the entire length of the pieces 1101 and 1102 except at the rear (not shown) end where the cavities acquire a semi-circular shape to closely conform to the connector 340'. The U-shaped cavities 1111, 1112 impart to the bristles pad a particular cross-sectional shape that is more desirable for a certain job. As illustrated in FIG. 11A, the shape 1151 of the bristles pad is generally square or rectangular. As such, when the first piece 1101 and the second piece 1102 are connected to each other, the U-shaped cavities 1111, 1112 form a generally square or rectangular cavity. The bristle positioning attachment 1100 also includes a detent 1150 for engaging the mounting member 1010. The detent 1150 is a tab, which is selectively engageable with anyone of the crevasses 1012. The bristles pad support can be moved along the connector 340' by applying enough force to disengage the tab 1150 from its current crevasse 1012 to relocate it in another crevasse 1012 that corresponds to the desired position of the bristles pad support.

Figure 11C:
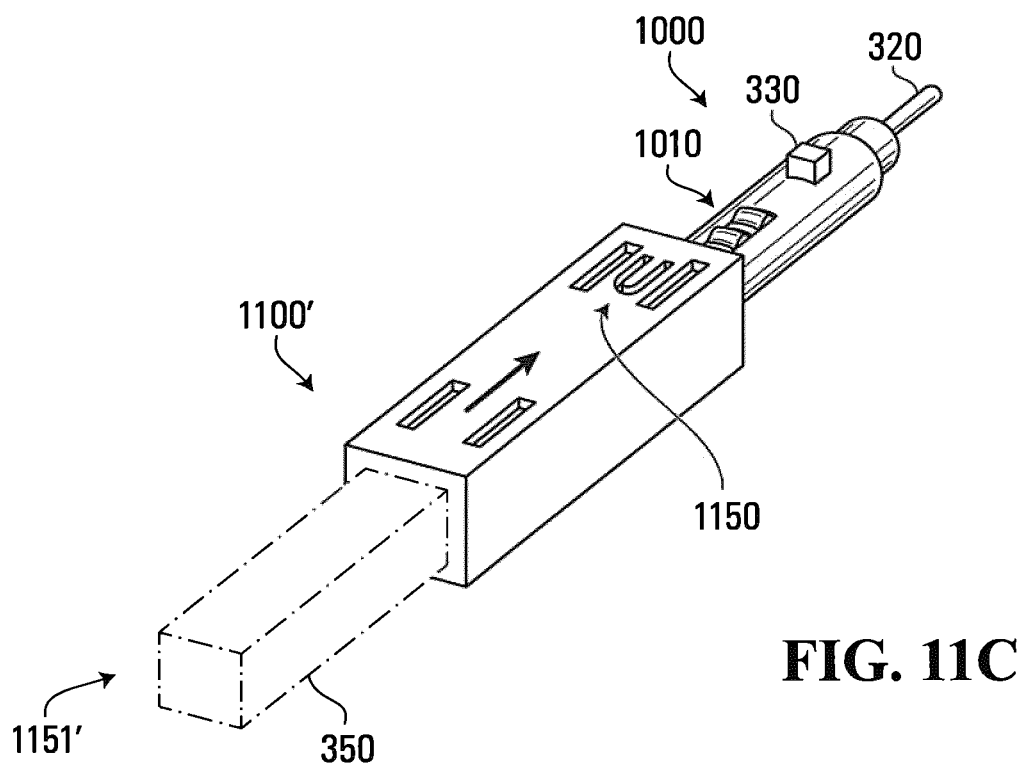
FIG. 11C is a perspective view of the brush and the bristles pad positioning attachment in a different position in accordance with an embodiment of the invention.

FIG. 11C shows the bristle positioning attachment 1100 in a different position than the one shown at FIG. 11A, in which a larger portion of the bristles pad is exposed to provide the bristles pad with increased flexibility.

Figure 12:
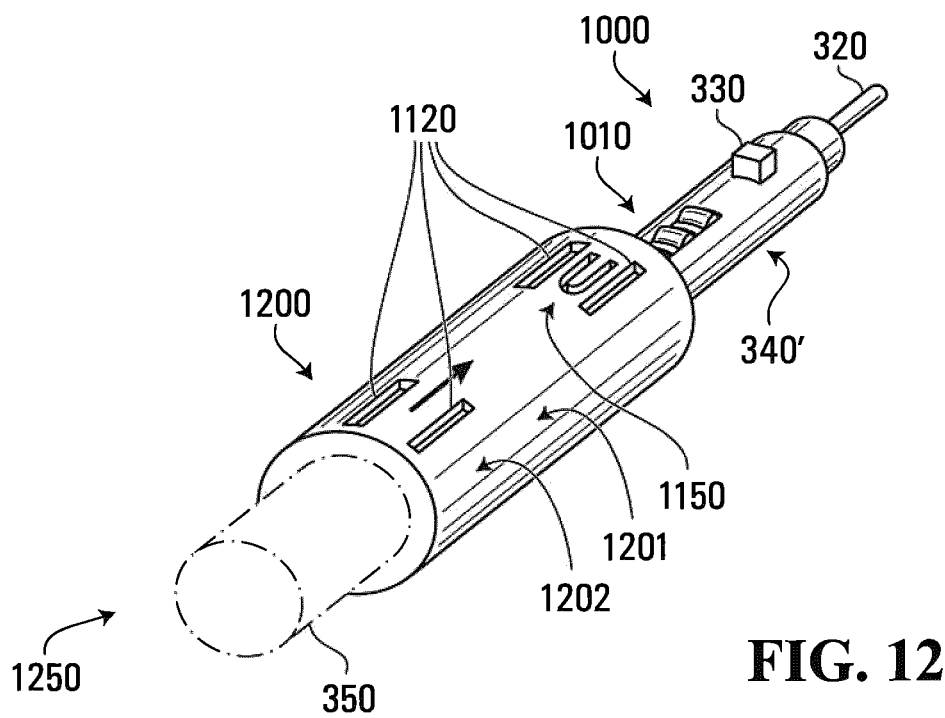
FIG. 12 is a perspective view of the brush and a bristles pad positioning attachment for positioning the bristles generally circularly in accordance with an embodiment of the invention.

FIG. 12 shows a bristles pad support configured to impart to the bristles pad a circular cross-section.

Figure 13A:
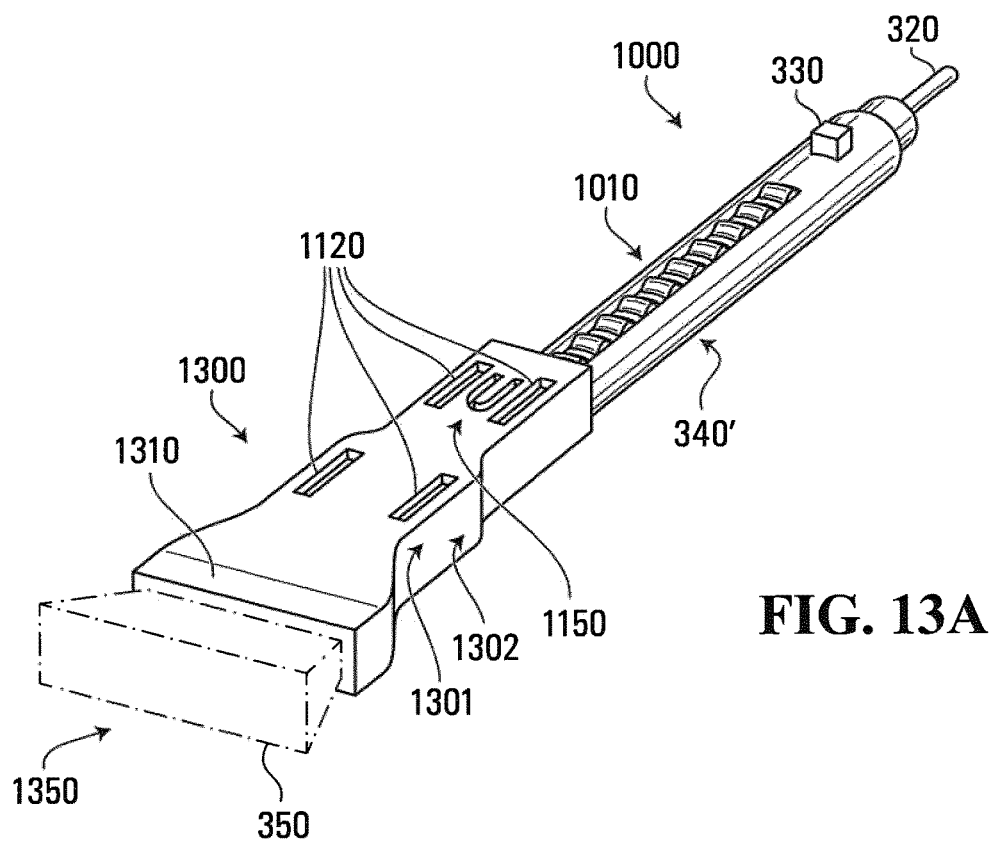
FIG. 13A is a perspective view of the brush and a bristles pad positioning attachment for spreading the bristles in accordance with an embodiment of the invention.
Figure 13B:
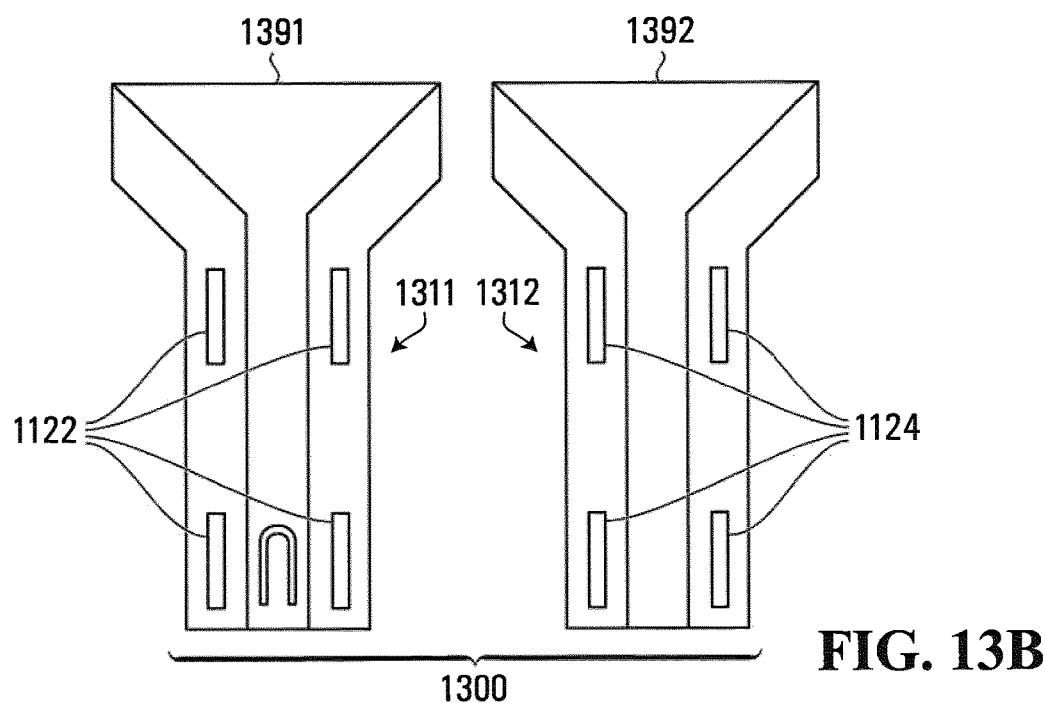
FIG. 13B illustrates the bristles pad positioning attachment where the first piece and the second piece are not attached to each other.
Figure 13C:
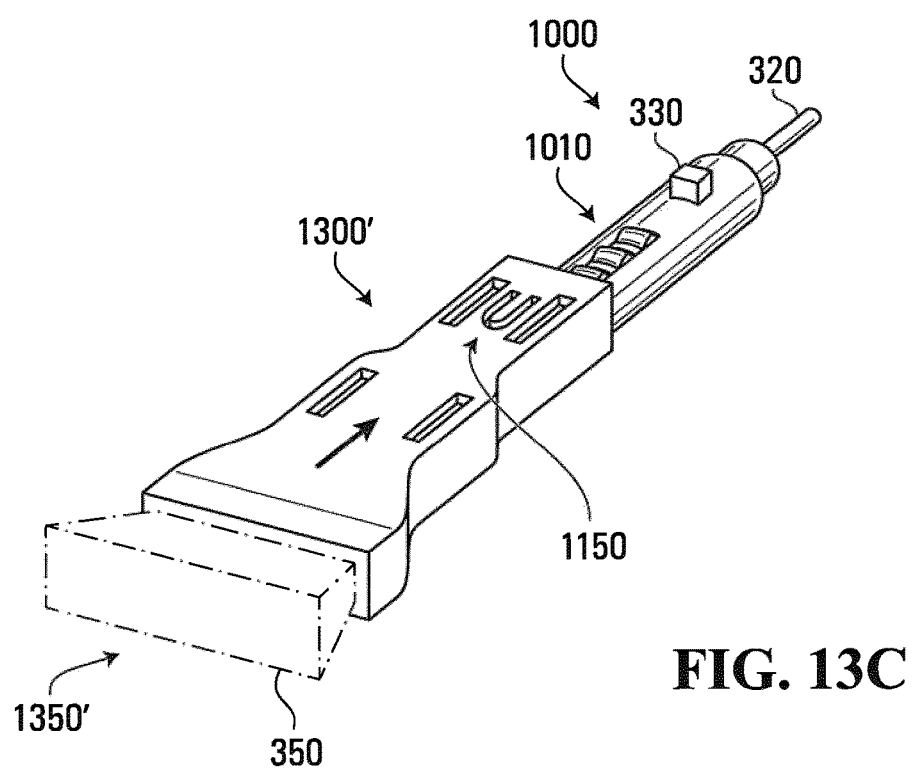
FIG. 13C is a perspective view of the brush and a bristles pad positioning attachment for spreading the bristles in a different position in accordance with an embodiment of the invention.

FIG. 13A, 13C illustrate is yet another variant in which the bristles pad support is configured to spread out the bristles. The bristles pad support can be moved as discussed earlier along the connector '340, as shown by the arrow in FIG. 13C.

FIG. 13B illustrates the bristle the constituent elements of the bristles pad support, shown separated from one another.

Figure 14A:
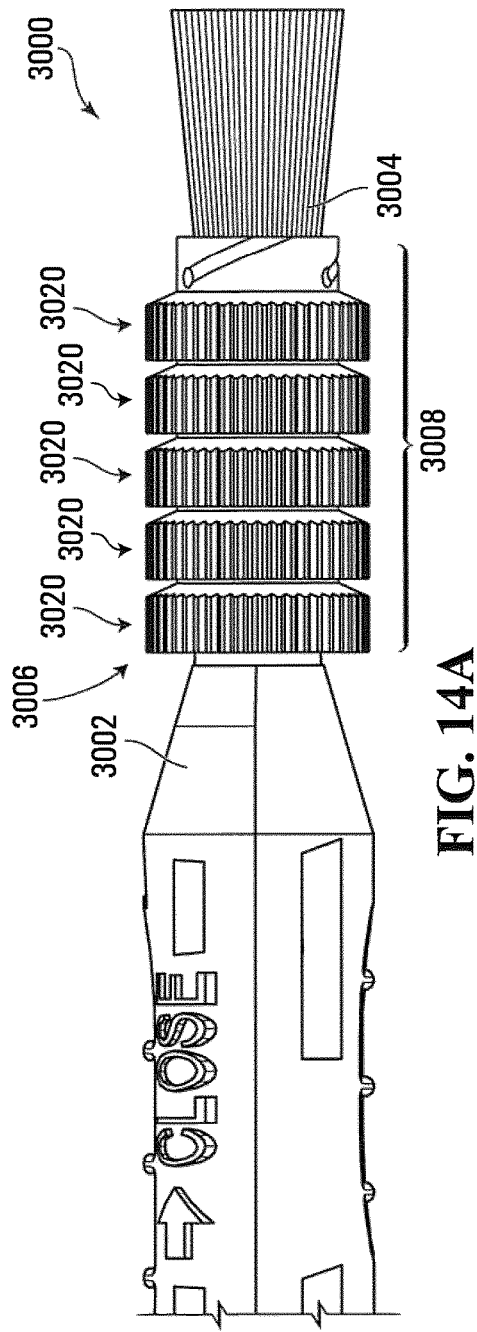
FIGS. 14A and 14B are top views of hand pieces with bristles pad supports made of stacks of twist rings.
Figure 14B:
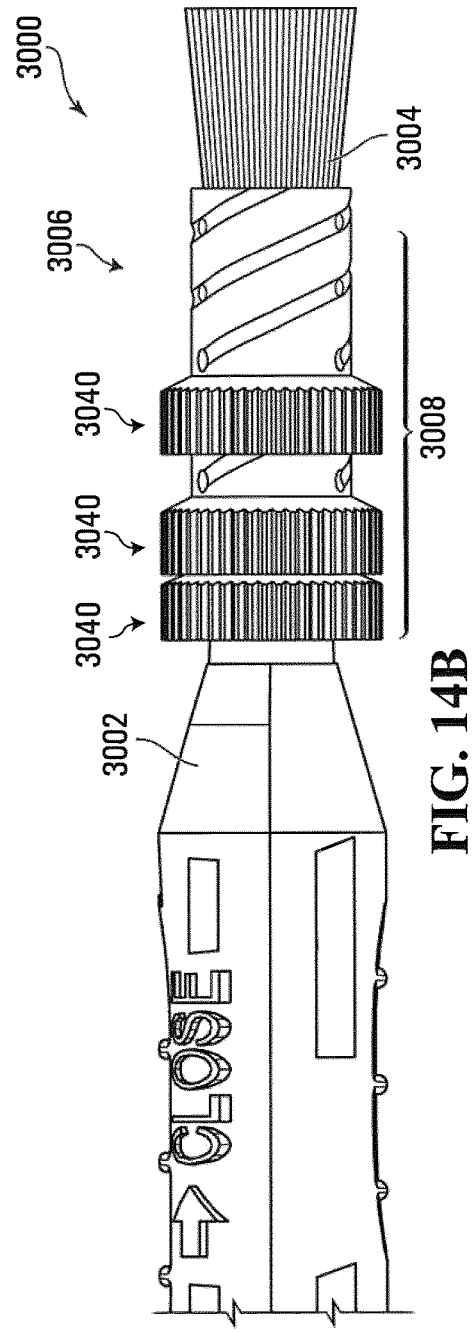

FIGS. 14A-B depict an embodiment of an end-piece 3000, according to another variant. The end-piece 3000 functions similarly to the end-piece 200 and has components similar thereto. Specifically, the end-piece 3000 comprises an end-piece body 3002 and a brush 3006. The end-piece body 3002 is made of a non-conductive material such as plastic, rubber or any other suitable material.

The brush 3006 comprises a pad of conductive bristles 3004 that are electrically connected via the brush support to the power supply of the weld cleaning apparatus. Electrolytic solution is supplied to the bristles pad 3004 in the same fashion as described with earlier embodiments. The bristles pad 3004 may be made if conductive carbon fiber bristles or any other suitable bristles made out of a conductive material.

The end-piece 3000 comprises a bristles pad support system 3008, which supports the bristles pad 3004, and optionally can be used to impart to the bristles pad 3004 a desired cross-sectional shape to better suit the particular weld cleaning job. The bristle support system 3008 is releasably attached to the end-piece body 3002 by using the arrangement illustrated in FIGS. 3A and 3B, for example.

Figure 15A:
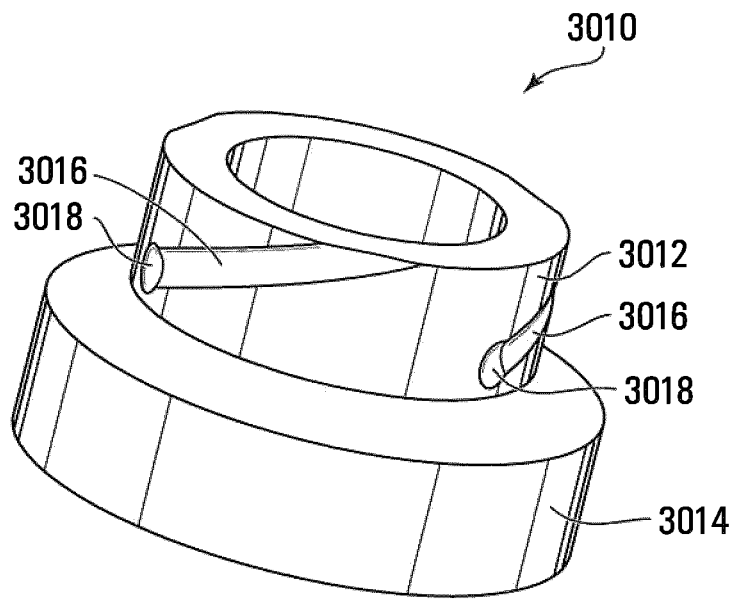
FIGS. 15A and 15B are perspective views of twist rings of the type used for the stack shown in FIG. 14A.
Figure 15B:
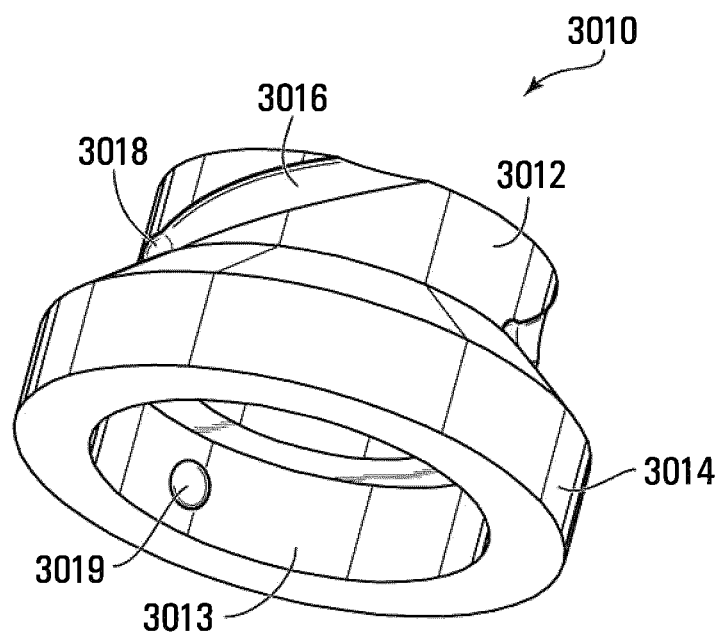

With further reference to FIGS. 15A-B, in a first embodiment the bristles pad support 3008 is implemented as a stack of twist rings 3010. Each twist ring 3010 comprises upper and lower cylindrical portions 3012, 3014, threads 3016, female detents 3018 and male detents 3019. Each of the cylindrical portions 3012, 3014, has a cylindrical wall, which defines an aperture about its respective center, and the cylindrical portions 3012, 3014 are concentric. The upper cylindrical portion 3012 rests on the lower cylindrical portion 3014, and has a diameter, which is less than the diameter of the lower cylindrical portion 3014. More specifically, the diameter of the upper cylindrical portion 3012 of the twist support ring 3010 is such that it can fit into the lower cylindrical portion 3014 of a second twist ring 3010.

The upper cylindrical portion 3012 has one or more threads 3016 which are distributed along an outer face of the cylindrical wall of the upper cylindrical portion 3012, and which span an entire height of the upper cylindrical portion 3012. Typically, the upper cylindrical portion 3012 will have two or more thread segments 3016 which are equally distributed on the cylindrical portion 3012. The threads 3016 are implemented as grooves and terminate each with a female detent 3018, which is defined by with rounded shallowed area.

With continued reference to FIG. 15B, the twist ring 3010 comprises at least one male detent 3019 positioned on an inner wall 3013 of the lower cylindrical portion 3014. The male detents 3019 are configured for slidably mating with the threads 3016, such that a first twist ring 3010 can be threadedly engaged with a second twist ring 3010, the engagement being produced by the male detents 3019 slidably running in the threads 3016.

The male detents 3019 can be forcefully pushed to interlock with the female detents 3018. The interlocking of the male detents 3019 with the female detents 3018 locks the twist rings against unwanted rotation and ultimately separation.

Figure 15C:
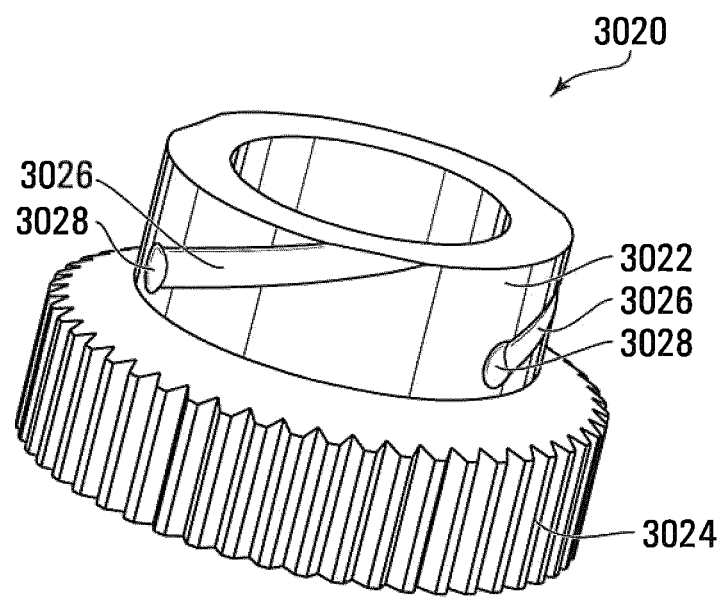
FIG. 15C is a perspective view of a twist ring according to a variant that has knurls for a better grip.

The variant shown in FIG. 15C the lower cylindrical portion 3014 has a knurled surface 3024 including a series of indentations to allow the fingers of the operator to get a better grip.

Figure 16A:
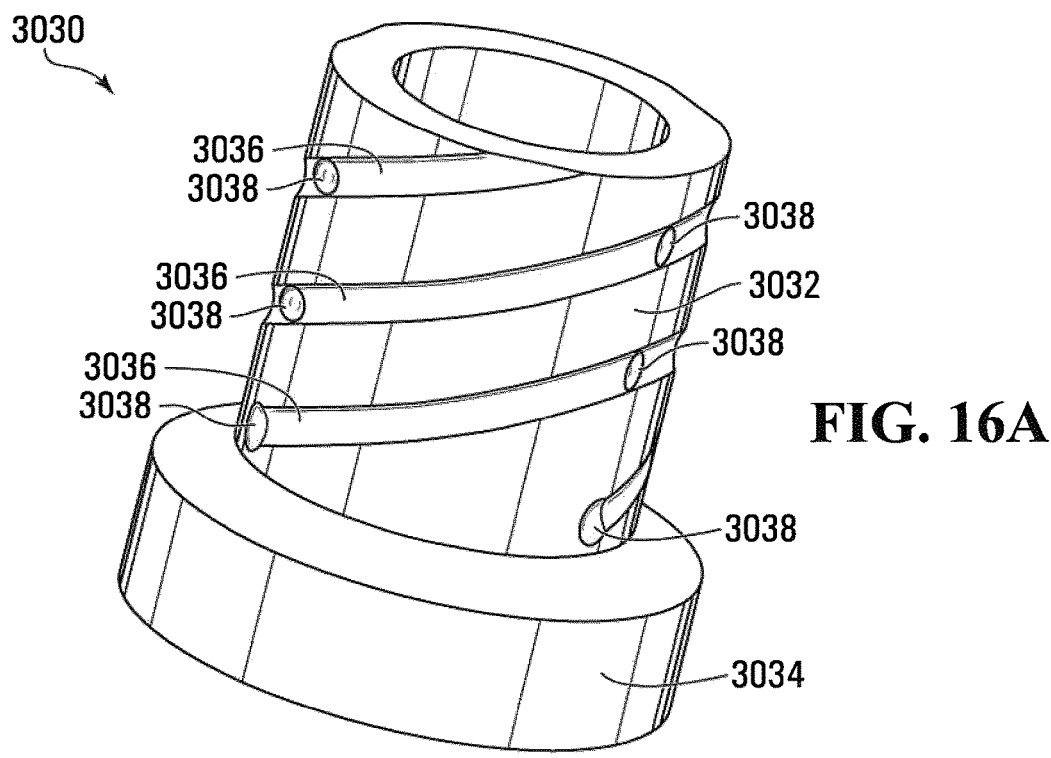
FIG. 16A is a perspective view of a twist ring of the type used for the stack shown in FIG. 14B.

The variant shown in FIG. 16A has an extended upper cylindrical portion 3032 allowing inter-engaged twist rings to telescope over a longer distance. In the example shown, the upper cylindrical portion 3032 has multiple female detents defining a number of positions in which a male detent 3019 can be held captive, thus allowing locating the twist rings at selected positions one with relation to the other.

Figure 16B:
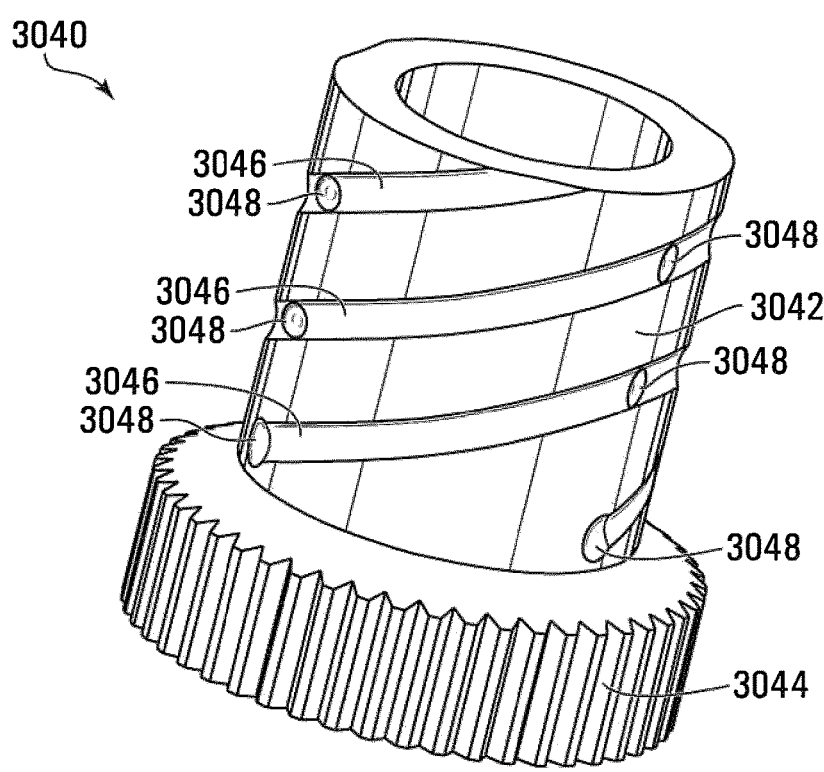
FIG. 16B is a perspective view of a twist ring according to a variant that has knurls for a better grip.
Figure 18A:
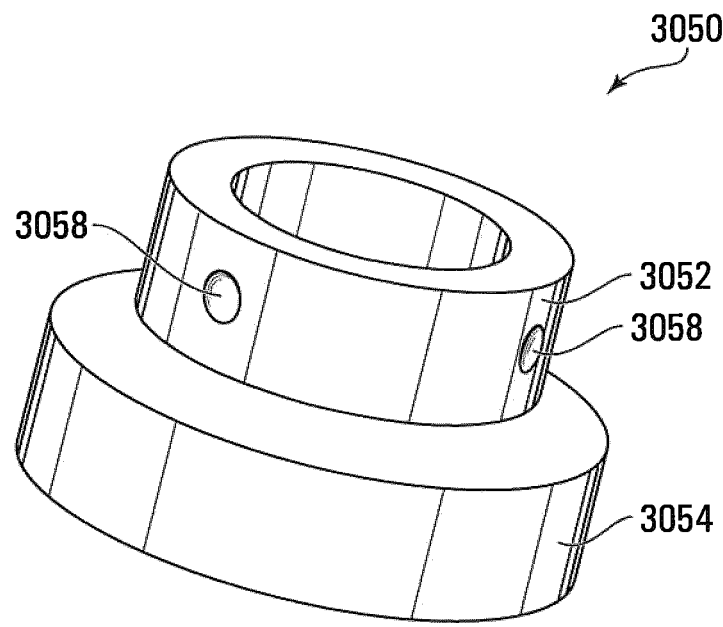
FIGS. 18A and 18B are perspective views of friction rings of the stack shown in FIG. 17A.
Figure 18B:
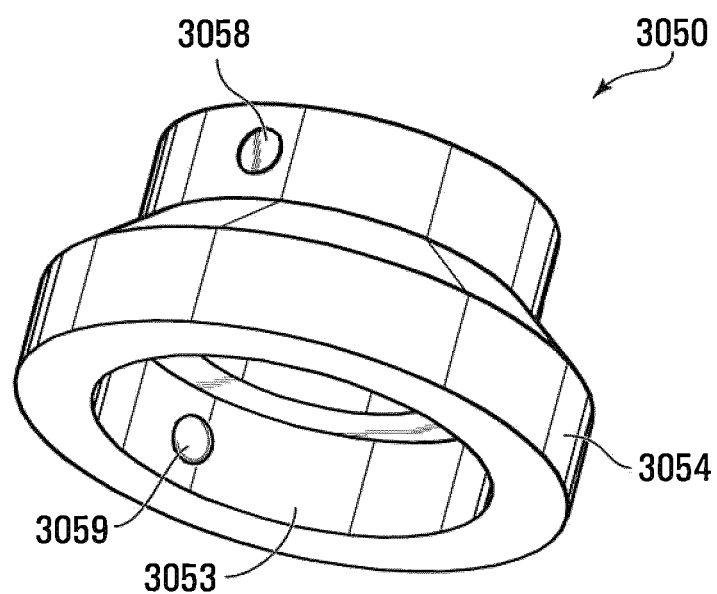

FIG. 16B shows a variant with a knurl, similar to the variant at FIG. 15C. With reference to FIGS. 18A-B, the bristles pad support is implemented as a stack of friction rings 3050. Each friction ring 3050 comprises upper and lower cylindrical portions 3052, 3054 that have no threads. The friction rings 3050 have female detents in the form of recesses 3058 for engaging the male detents in the form of projections 3059. The diameter of the upper cylindrical wall 3052 is selected such that when the support rings are inter-engaged the male detents 3059 frictionally engage the outer surface of the upper cylindrical wall 3052. When the projections 3059 snap in the female detents 3058, the support rings are locked in place against unwanted separation. To separate the support rings they are twisted with sufficient force to unseat the male detents 3059 from the female detents 3058 and the friction rings can then pulled apart.

Note that the position of the female detents 3058 and position of the male detents 3059 may be reversed; the male detents may be formed on the upper cylindrical wall while the female detents are formed on the internal cylindrical wall 3053.

Figure 18C:
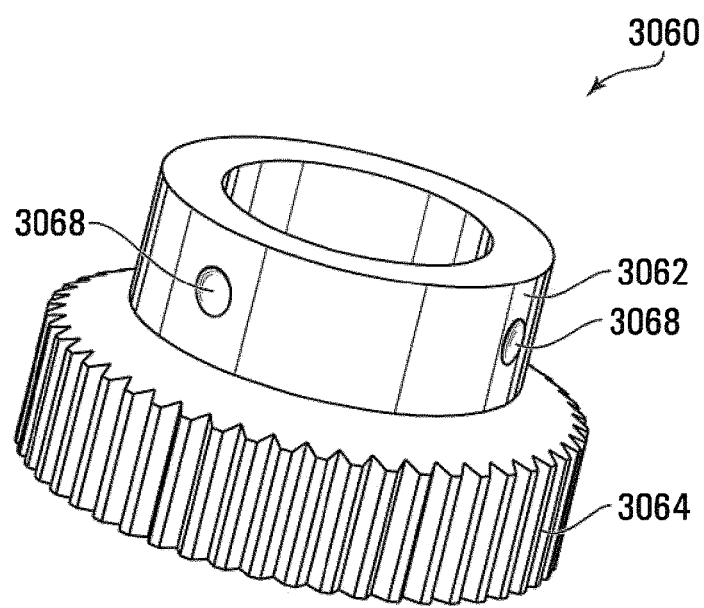
FIG. 18C is a perspective view of a friction ring according to a variant that has knurls for a better grip.

With reference to FIG. 18C, indentations 3064 can be provided for improved grip.

Figure 19A:
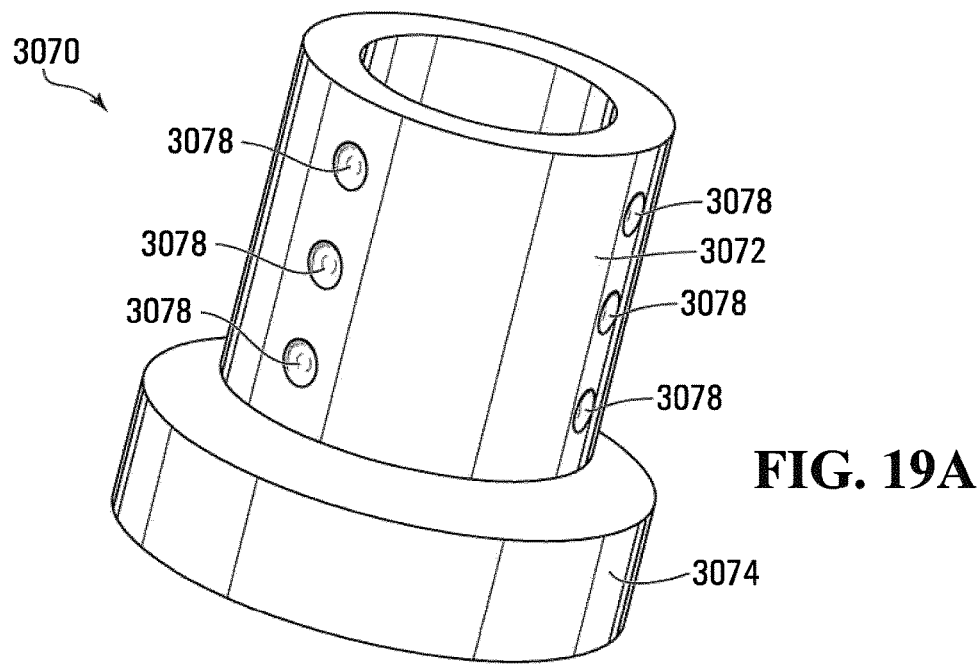
FIG. 19A is a perspective view of a friction ring of the type used for the stack shown in FIG. 17B.
Figure 19B:
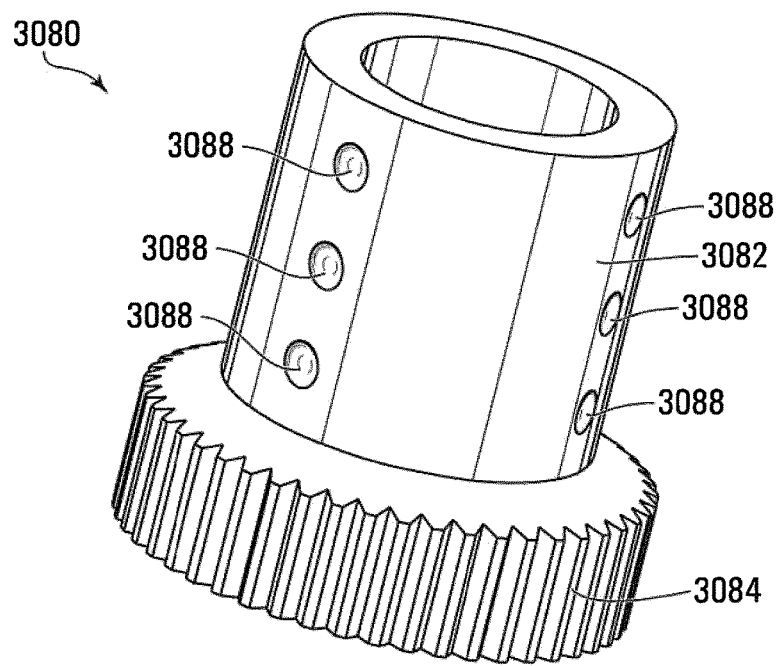
FIG. 19B is a perspective view of a friction ring according to a variant having knurls for a better grip.

FIGS. 19A and 19B show a further variant of the friction ring 3050 that is extended to provide multiple detent receiving positions.

Figure 20:
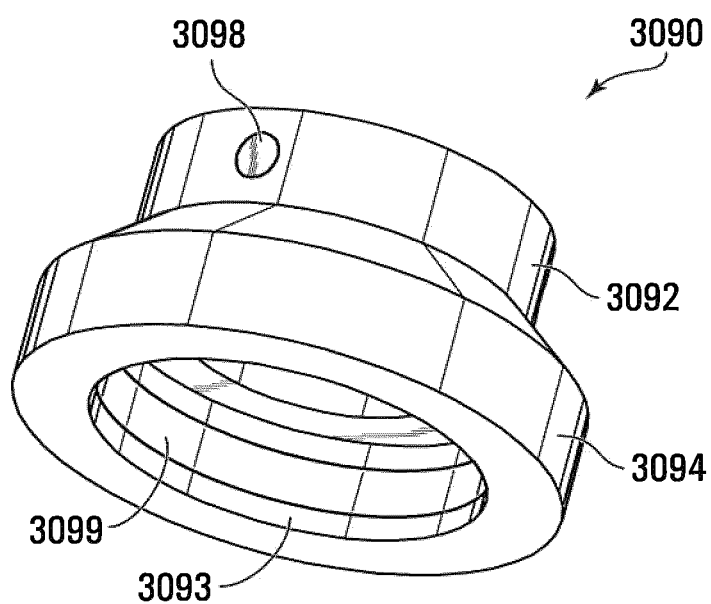
FIG. 20 is a perspective view of a support ring using magnetic retention force.

A further variant of the bristles pad support is illustrated in FIG. 20 that uses magnetic force to retain the support rings. A band 3099 of ferromagnetic material is provided inside the support ring 3099 that engages magnets 3098 of an adjacent support ring 3099.

In use, the support rings in FIGS. 14A, 15A, 15B, 15C are stacked, the number of support rings in a stack is selected such that the stack covers the entire length of the bristles pad less a small exposed part at the tip, which is the working part of the brush. If desired, the operator can remove one or more of the rings from the stack to expose a longer part of the bristles pad for applications where a brush with more flexibility is desired. As the bristles wear out, they get shorter. To keep the same exposed length, the operator removes a support ring from the stack. This is accomplished by twisting off the outermost support ring and removing it from the stack. In the embodiment shown at FIGS. 15A, 15B and 15C, the operator holds the stack in his hand and unscrews the outermost ring by applying sufficient force to dislodge the male detents 3019 from the female detents 3018. The support ring so removed is a throw away item. Alternatively, the support rings can be retained for reuse. For instance, there may be applications where the operator needs to remove a number of support rings to expose a larger portion of the bristles and when the job is completed, the operator puts the rings back together to reassemble the original stack.

The operation of the support rings 14B, 16A, 16B is somewhat different. Since the support rings 3040 can be set at different positions, one with relation to the other, the stack will typically have fewer support rings 3040. The stack shown in FIG. 14B has three support rings 3040 but even two support rings 3040 could be sufficient. In contrast to the earlier example, the stack of rings 3040 is fully expanded, in other words the projections (male detents) 3019 are seated in the outermost female detents 3038. As the bristles wear out, the support rings 3040 are progressively closed, the female detents 3038 defining respective positions in which the stack length is diminished in stages. The last adjustment position is the one where the support rings 3040 are fully closed. If the bristles need to be further exposed, at that point, the outermost support ring 3040 is removed from the stack and thrown away.

The operation of the friction support rings 3050 shown in FIGS. 18A, 18B, 18C, 19A and 19B is similar as in the above examples, with the difference that there are no threads to guide the motion of the support rings as they are being separated. The operator therefore needs to fiddle with the support rings until the male detents snap in the female detents that locate the support rings 3050 in the desired relative positions.

Figure 17A:
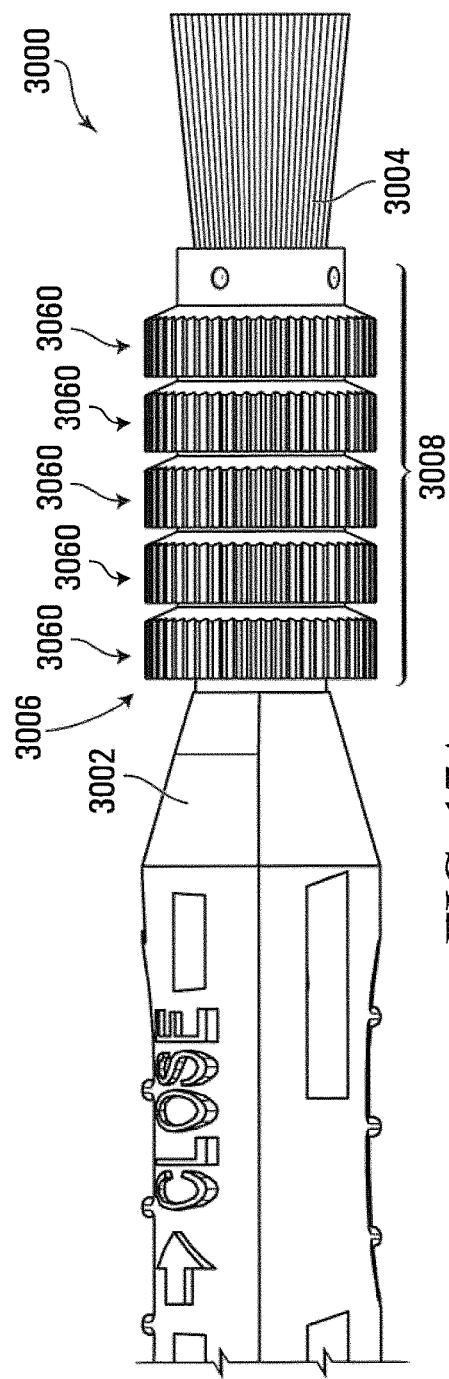
FIGS. 17A and 17B are top views of hand pieces using bristles pad support rings made of stacks of friction rings.
Figure 17B:
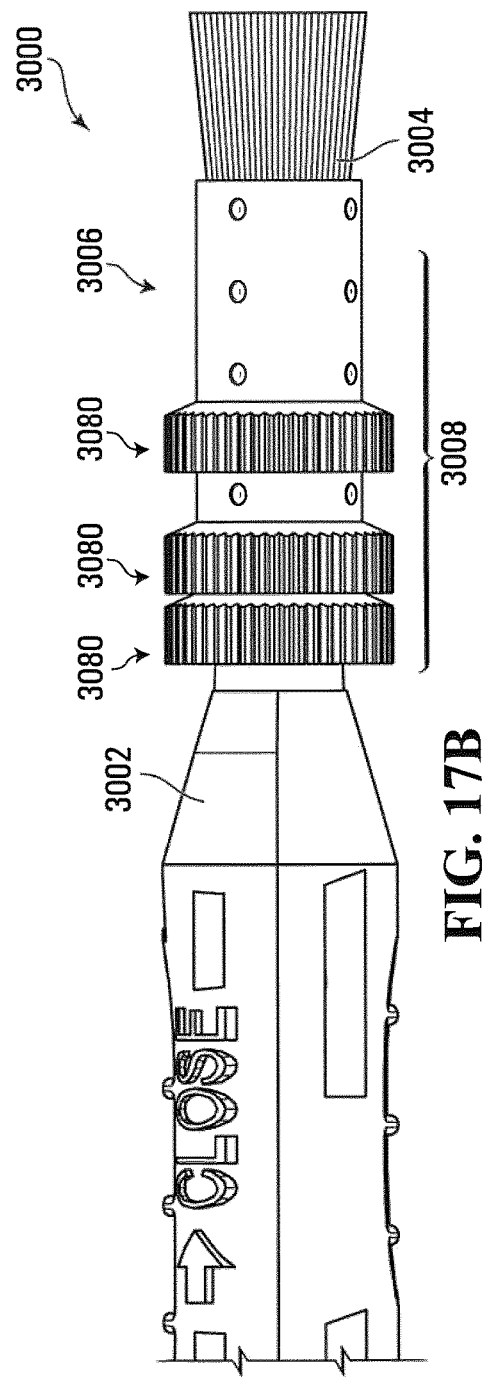

FIGS. 17A-B show stacks made up of friction support rings 3060, 3080.

Figure 21:
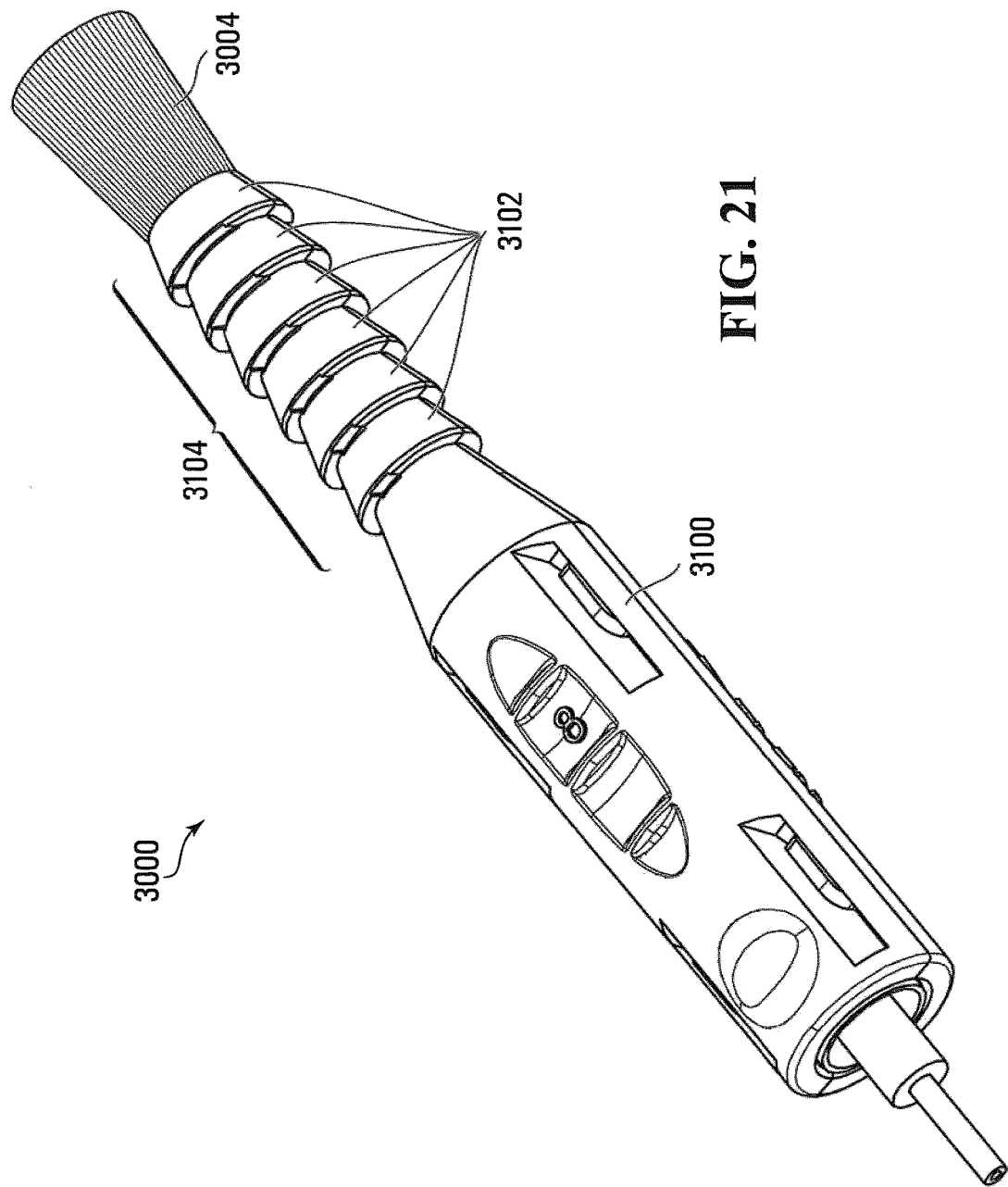
FIG. 21 is a perspective view of a hand piece using a bristles support pad having frangible support elements.
Figure 22A:
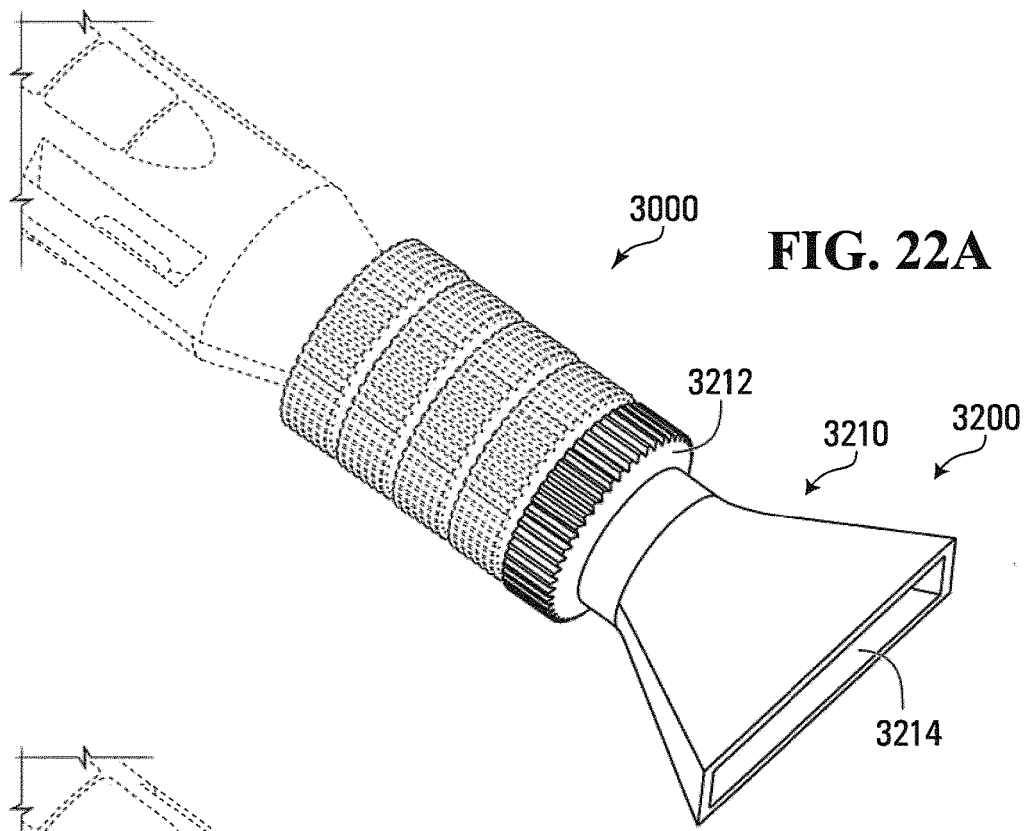
Figure 22B:
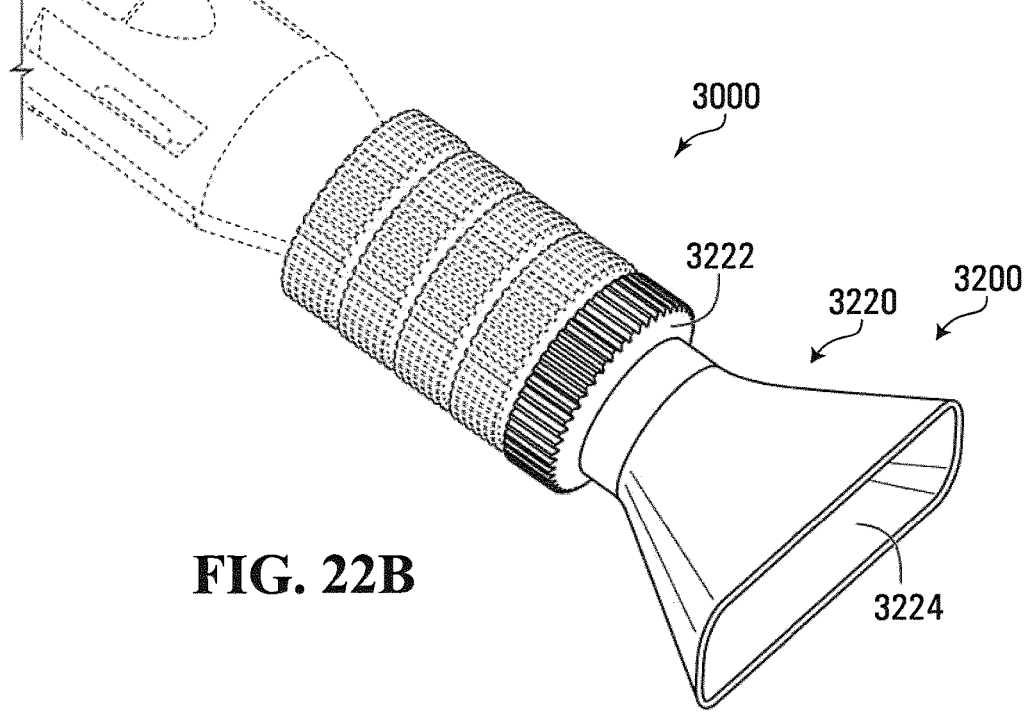
Figure 22C:
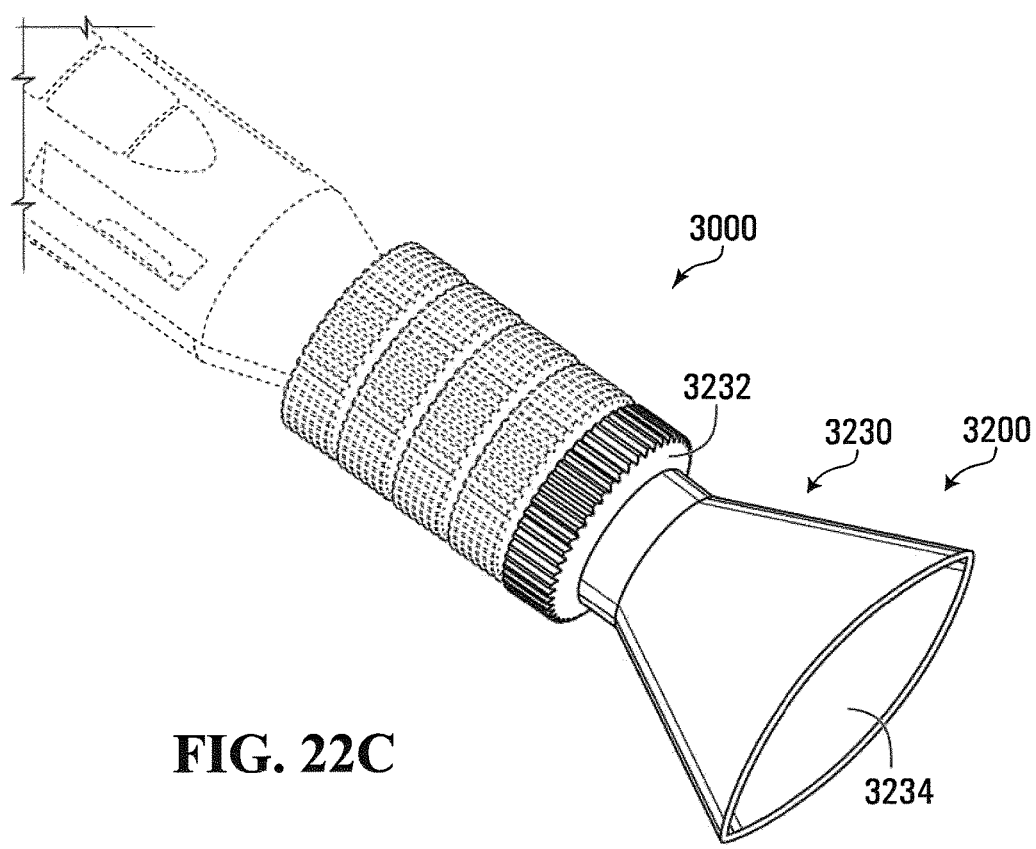

With reference to FIG. 21, another embodiment of the end-piece 3000 is depicted. In this embodiment, the end-piece 3000 comprises an end-piece body 3100 for retaining the bristles pad 3004, a bristles pad support 3104 made up of a stack of breakaway elements 3102 which surround the bristles pad 3004. The end-piece body 3100 is similar to the end-piece body 3002.

The breakaway elements 3102 are shaped as frusto-conical sections the smaller end of one section fitting in the larger end of the adjacent one. The breakaway elements 3102 are linked by frangible tabs that can be broken to separate the elements 3102 from each other.

Removing one or more elements 3102 by snapping the frangible tabs linking two proximate elements 3102 has the effect of shortening the bristles pad support 3104. As the bristles pad wears out, the breakaway elements 3102 are snapped off to keep the exposed tip of the bristles pad at the desired length.

While the breakaway elements 3102 have been described as frusto-conical portions, these may be implemented in any other suitable fashion, including cylindrical elements, pyramidal elements, cubic elements, or any variation thereof.

In a variant, the end-piece 3000 is provided with a bristles pad shaping spout 3200, which imparts to the bristles pad a particular profile. With reference to FIGS. 22A-E, five variants (3210, 3220, 3230, 3240, 3250) of the spout 3200 are shown. For example, the spout 3200 can be configured such as to spread out the bristles pad to provide a brush with a larger cover area. The spout can be mounted to any one of the support rings discussed above and would typically constitute the outermost support ring in the stack. That support ring is normally not a throw away item and can be reused. When the bristles pad support is to be shortened to account for bristles wear, the outermost support ring, the one with the spout is removed, the next ring is also removed and thrown away and the support ring with the spout put back in place.

To allow positioning the bristles pad in the desired angular orientation the support ring carrying the spout can be made rotatable relative to the adjacent support ring about the longitudinal axis of the brush. Advantageously, detents can be provided at different angular orientations, such that the spout can be set and maintained in the angular orientation that is the most convenient to the user.

Figure 23:
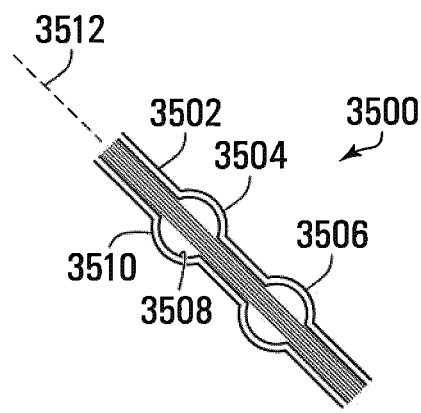
FIG. 23 is a cross-sectional view of a multi-element bristles pad support, the elements being connected by ball joints.

FIG. 23 illustrates yet another example of implementation where the bristles pad support 3500 can be bent to orient the working end of the brush at an angle relative to the end-piece (not shown). The bristles pad support 3500 includes three sections 3502, 3504 and 3506 that are articulated, in other words they can be set at an angle one with relation to the other. The section 3502 has at its lower end a ball shaped part 3508, which is a male ball shaped part. The section 3504 has at its upper end a female ball shaped part 3510. The female ball shaped part 3510 receives the male ball shaped part 3508 to form a ball joint allowing the sections 3502 and 3504 to be angularly oriented as desired. The fit between the female ball shaped part 3510 and the male ball shaped part 3508 is a frictional fit such that once the sections 3502 and 3504 are set in the desired orientation they resist forces exerted on the ball joint during normal use of the brush. To change the angular orientation, a higher effort is required to overcome the friction. The interconnection between the sections 3504 and 3506 also uses a ball joint and works as discussed above.

Sections 3502, 3504 and 3506 are made of plastic material that has sufficient rigidity and resilience such that the sections 3502, 3504 and 3506 can be snap fitted to one another. In other words by pulling two sections away, say sections 3502 and 3504 with sufficient force, the female ball shaped part 3504 will spread out slightly to allow the male shaped part 3508 to be slip out of the ball joint. The assembly is the reverse that is the sections 3502 and 3504 are pushed against each other such that the female ball shaped part 3508 resiliently spreads out sufficiently to accept the male ball shaped part 3508. The ability of the sections 3502, 3504 and 3506 to be snap fitted to each other allows assembling the bristles pad support 3500 of the desired length and to progressively remove sections as the bristles pad wears out.

Figure 24:
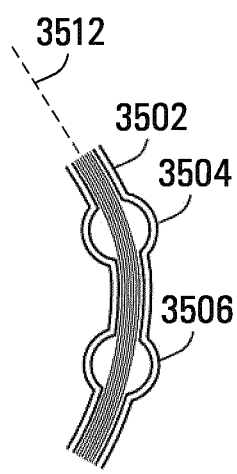
FIG. 24 is a view similar to FIG. 23 in which the bristles pad support is being flexed to angularly orient the bristles pad.

In FIG. 23, the bristles pad support 3500 is shown as being straight, in other words it extends along the longitudinal axis of the hand piece. The longitudinal axis is shown by the dotted line 3512. FIG. 24 illustrates the bristles pad support 3500 as being bent at an angle relative to the longitudinal axis 3512. The configuration imparts a bent to the bristles pad to adapt its shape to better suit a particular job, which may be more difficult to perform with a bristles pad that is straight.

Figure 25:
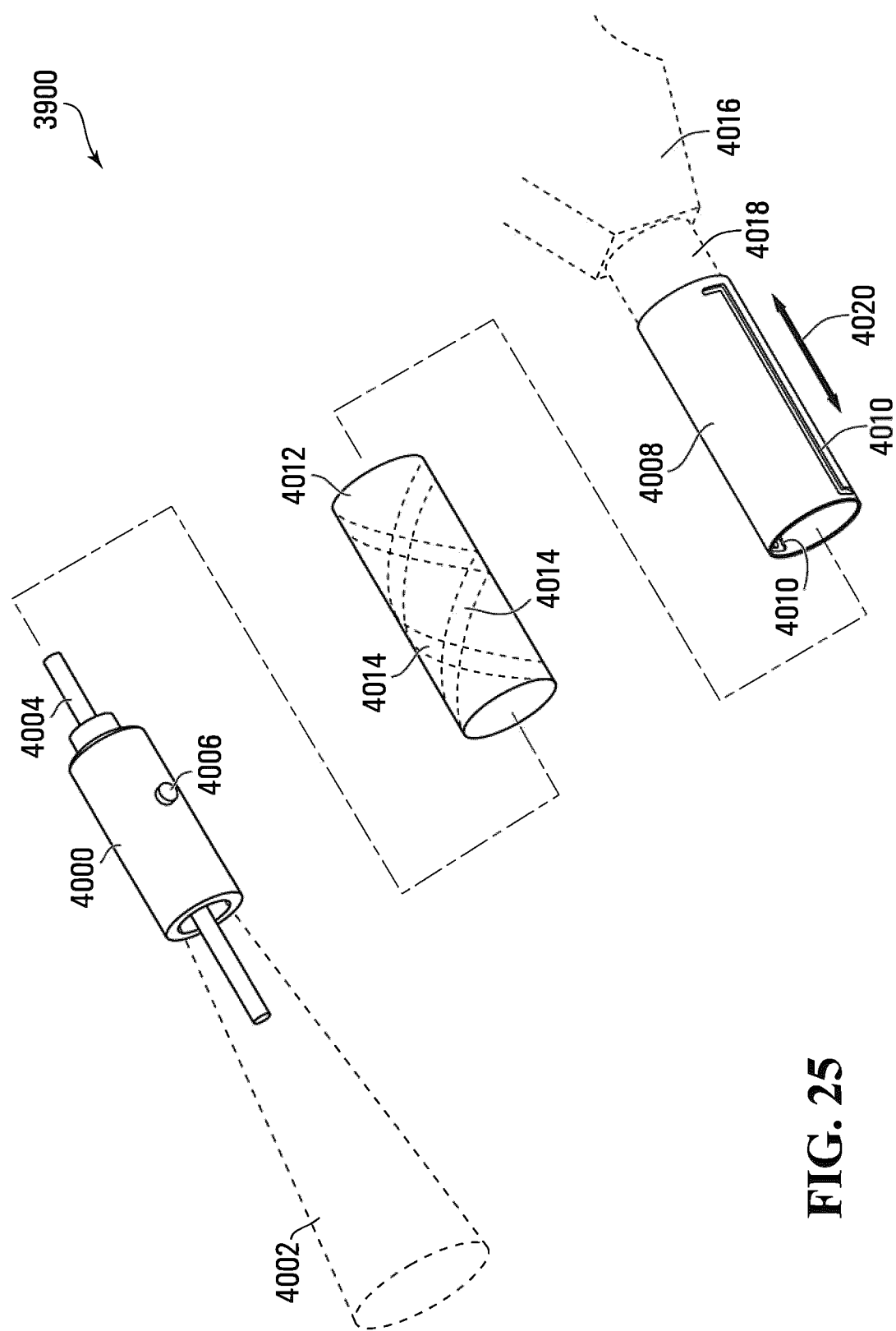
FIG. 25 is a perspective exploded view of a bristles pad and a bristles pad support that is slidable along the bristles pad.

FIG. 25 is yet another embodiment of the bristles pad support which uses a lipstick case-like mechanism with telescoping parts to adjust the length of the support along the bristles pad. The bristles pad support 3900 has a connector 4000 that supports a bristles pad 4002, shown in dotted lines. As with the previous embodiments the connector 4000 physically carries the bristles pad, provides an electrical supply connection to the bristles and also supplies electrolyte through the conduit 4004. The body of the connector 4000 is generally cylindrical and has a pair of pins 4006 projecting laterally. Only one pin 4006 is shown in the drawings, the other pin being generally opposite the pin 4006.

The connector 4000 and the bristles pad 4002 are slidably received in an inner tube 4008, which has a pair, or opposite Z-shaped slots 4010. The dimensions of the various pieces are selected such that the pins 4006 slidably fit in the respective slots 4010 and slightly project therefrom.

The inner tube 4008 is slidably received in an outer tube 4012. The outer tube 4012 has a pair of internal helical grooves 4014 dimensioned to receive the projections 4006 that extend through the slots 4010.

The connector 4000 is secured to the hand piece 4016 in the usual fashion to establish the desired electrical and fluid connections. The hand piece 4016 can be the same as the examples provided earlier with the exception that it has a longer neck 4018 to allow the bristles pad support 3900 to move back and forth in the direction along the arrow 4020.

The outer tube 4012 is mounted on the inner tube 4008 and receives the pins 4006 in the grooves 4014. The outer tube 4012 can be provided with a knurl for a better grip. When the operator rotates the outer tube 4012, the rotation causes a longitudinal displacement of the inner and outer tubes 4008, 4012 about the connector 4000 such as to expose more or less of the bristles. This bristles pad support 3900 can be designed of sufficient length such as to be able to completely enclose the bristles pad, such that when the weld cleaning apparatus is not being used, the bristles pad support is fully extended to protect the bristles pad.

The bristles pad with the bristles pad supports shown in FIGS. 14A-25 can be made available as a unit such that when the bristles pad is worn out, it is removed from the end-piece and replaced by a new unit. In other words, the user would purchase a new unit consisting of a bristles pad and the bristles pad support and simply attach it to the end-piece. Such unit can use the connector 340 discussed earlier. In this form of implementation, the body of the connector 340 is configured to act as a bristles pad support carrier. In the example of the bristles pad support 3008 the twist ring 3020 which is the first twist ring in the stack is mounted to the connector 340. The aperture of the first twist ring is dimensioned to receive the connector 340 therein. To avoid separation, the twist ring may be adhesively or mechanically fastened to the connector 340. In this fashion, when the bristles pad is worn out, the twist ring that is secured to the connector 340 is twisted to separate the connector 340 from the end-piece. The connector 340, the twist ring and the bristles pad stub is thrown out. The new unit is then installed on the end-piece by inserting the connector 340 in the end-piece and locking it in place.

All documents mentioned in the specification are herein incorporated by reference.

The invention claimed is:

1. A brush for cleaning welds, comprising:
   a. a bristles pad, the bristles pad being electrically conductive to deliver electrical current to a weld to be cleaned when the bristles pad is in physical contact with the weld;
   b. a bristles pad support, the bristles pad support including an elongated body receiving the bristles pad and extending along the bristles pad, the elongated body including a first section and a second section attached to each other, the first section being separable from the second section to reduce a length of the bristles pad support;
   c. wherein the bristles pad has a working end portion side including a working end portion for engaging the weld, and an opposite support end portion side including a support end portion for mounting to an end-piece configured to be grasped by a hand of an operator; and
   d. wherein when the first section is separated from the second section, the first section is configured to be removed through the working end portion side.

2. A brush for cleaning welds as defined in claim 1, wherein the removal of the first section extends a length of an unsupported portion of the bristles pad, which extends past the bristles pad support.

3. A brush for cleaning welds as defined in claim 1, wherein the bristles pad support is mounted to the bristles pad in a non-sliding relationship such as to permanently preclude the bristles pad support to slide along the bristles pad.

4. A brush for cleaning welds as defined in claim 1, wherein the first section is linked with the second section through a frangible connection that can be manually snapped-off to separate the first section from the second section.

5. A brush for cleaning welds as defined in claim 1, wherein the first section is linked with the second section through a connection allowing separation of the first and second section and a subsequent re-connection of the first and second sections.

6. A brush for cleaning welds as defined in claim 5, wherein one of the first section and the second section includes a projection, the other of the first section and the second section including a recess for matingly receiving the projection.

7. A brush for cleaning welds as defined in claim 6, wherein the other of the first section and the second section including a plurality of recesses providing a plurality of alternate positions for the projection.

8. A brush for cleaning welds as defined in claim 5 wherein the first and second sections are separable by turning the first and second sections relatively to one another.

9. A brush for cleaning welds as defined in claim 8, wherein the first and second sections are threadedly engaged.

10. A brush for cleaning welds as defined in claim 1, wherein the bristles pad is releasably mounted to the end-piece.

11. A brush for cleaning welds comprising:
    a. a bristles pad, the bristles pad being electrically conductive to deliver electrical current to a weld to be cleaned when the bristles pad is in physical contact with the weld;
    b. a bristles pad support extending at least partially along the bristles pad;
    c. a mounting member, the bristles pad and the bristles pad support being mounted to the mounting member; and
    d. a connection element on the mounting member for releasable inter-fitting engagement with a mating connection device on a handle piece on which the brush is to be mounted, the connection element configured to establish the inter-fitting engagement with the mating connection device through an angular motion of the mounting member relative to the handle piece, the connection element configured to establish a fluid connection with the mating connection device when the inter-fitting engagement is achieved to receive a cleaning fluid from the handle piece, the connection element further configured to establish an electrical connection with the mating connection device when the inter-fitting engagement is achieved to deliver the electrical current to the weld.

12. A brush for cleaning welds as defined in claim 11, the connection element being engageable to the mating connection device in one of two orientations.

13. A brush for cleaning welds as defined in claim 11, wherein the achieved inter-fitting engagement of the connection element with the mating connection device is such as to lock the mounting member relative to the handle piece against unwanted angular motion.

14. A brush for cleaning welds as defined in claim 11, the angular motion required to achieve the inter-fitting engagement being a counter-clockwise motion.

* * * * *